United States Patent
Lalka et al.

(10) Patent No.: US 10,506,375 B2
(45) Date of Patent: *Dec. 10, 2019

(54) DYNAMIC NOTIFICATION ENGINE FOR NOTIFICATION THROTTLING BASED ON CONTEXTUAL ANALYSIS

(71) Applicant: The Toronto-Dominion Bank, Toronto (CA)

(72) Inventors: Vipul Kishore Lalka, Oakville (CA); Sarabjit Singh Walia, Demarest, NJ (US); Edward Robert Lucas Lounsbury, Toronto (CA); John Jong-Suk Lee, Toronto (CA); Arun Victor Jagga, Toronto (CA)

(73) Assignee: The Toronto-Dominion Bank, Toronto (CA)

( * ) Notice: Subject to any disclaimer, the term of this patent is extended or adjusted under 35 U.S.C. 154(b) by 148 days.

This patent is subject to a terminal disclaimer.

(21) Appl. No.: 15/725,139

(22) Filed: Oct. 4, 2017

(65) Prior Publication Data
US 2019/0104382 A1  Apr. 4, 2019

Related U.S. Application Data

(63) Continuation of application No. 15/724,473, filed on Oct. 4, 2017.

(51) Int. Cl.
*H04W 4/02* (2018.01)
*G06Q 30/02* (2012.01)
(Continued)

(52) U.S. Cl.
CPC ........ *H04W 4/023* (2013.01); *G06Q 30/0261* (2013.01); *G06Q 30/0267* (2013.01);
(Continued)

(58) Field of Classification Search
CPC .......... G06Q 30/0261; G06Q 30/0267; G06Q 50/01; H04L 51/043; H04L 51/20; H04L 51/24; H04L 51/26; H04W 4/023
See application file for complete search history.

(56) References Cited

U.S. PATENT DOCUMENTS

| | | | |
|---|---|---|---|
| 6,978,132 B1 * | 12/2005 | Sladek | H04Q 3/0054 455/432.2 |
| 9,253,113 B2 | 2/2016 | Vasudevan et al. | |

(Continued)

OTHER PUBLICATIONS

"Did you know: Throttling Your Pushes," https://www.pushwoosh.com/blog/did_you_know_throttling_your_pushes/, Mar. 11, 2016, 1 page.

(Continued)

*Primary Examiner* — Mohamed A. Wasel
(74) *Attorney, Agent, or Firm* — Fish & Richardson P.C.

(57) ABSTRACT

Systems, software, and computer implemented methods for modifying triggered notifications associated with particular user profiles based on an analysis of contexts specific to the user profile. One example system includes operations for identifying at least one satisfied notification rule for triggering notifications to a user device associated with at least one particular user profile. For each particular user profile, a current user context associated with the particular user profile, including a particular location, is identified. In response to determining that the particular location satisfies at least one location-specific contextual rule, the triggered notification for the particular user profile is modified based on the particular modification associated with the satisfied location-specific contextual rule. If the particular location does not satisfy at least one location-specific contextual rule, a first signal is transmitted to a user device associated with the particular user profile with the triggered notification.

20 Claims, 5 Drawing Sheets

(51) Int. Cl.
  *G06Q 50/00* (2012.01)
  *H04L 12/58* (2006.01)
(52) U.S. Cl.
  CPC ........... *G06Q 50/01* (2013.01); *H04L 51/043* (2013.01); *H04L 51/14* (2013.01); *H04L 51/20* (2013.01); *H04L 51/24* (2013.01); *H04L 51/12* (2013.01); *H04L 51/26* (2013.01)

(56) References Cited

U.S. PATENT DOCUMENTS

| | | | |
|---|---|---|---|
| 9,329,583 B2 | 5/2016 | Slemmer et al. | |
| 9,344,371 B1 | 5/2016 | Sanyal et al. | |
| 9,672,717 B1* | 6/2017 | Slavin | G08B 21/18 |
| 9,930,161 B1* | 3/2018 | Brahmadevara | H04M 1/72519 |
| 2006/0286993 A1 | 12/2006 | Xie et al. | |
| 2007/0253340 A1 | 11/2007 | Varney et al. | |
| 2011/0060996 A1 | 3/2011 | Alberth, Jr. et al. | |
| 2013/0085861 A1* | 4/2013 | Dunlap | G01S 19/34 705/14.58 |
| 2013/0293363 A1 | 11/2013 | Plymouth et al. | |
| 2014/0229254 A1 | 8/2014 | Dammous et al. | |
| 2014/0358799 A1 | 12/2014 | Kingston et al. | |
| 2015/0012467 A1 | 1/2015 | Greystoke et al. | |
| 2015/0088739 A1* | 3/2015 | Desai | G06Q 20/322 705/42 |
| 2015/0262430 A1* | 9/2015 | Farrelly | H04L 67/306 705/13 |
| 2016/0330084 A1 | 11/2016 | Hunter et al. | |
| 2017/0041271 A1 | 2/2017 | Tal et al. | |
| 2017/0048396 A1 | 2/2017 | O'Connor et al. | |
| 2017/0053542 A1 | 2/2017 | Wilson et al. | |
| 2017/0070857 A1 | 3/2017 | Papakipos | |
| 2017/0315978 A1* | 11/2017 | Boucher | G06F 17/245 |
| 2017/0315979 A1* | 11/2017 | Boucher | G06F 3/04847 |
| 2018/0247272 A1* | 8/2018 | Cunico | G06Q 10/1093 |

OTHER PUBLICATIONS

"Throttling Push Notifications," [retrieved from internet on Oct. 4, 2017] https://marketing.carnival.io/docs/push-throttling, 2 pages.

\* cited by examiner

DYNAMIC NOTIFICATION ENGINE FOR NOTIFICATION THROTTLING BASED ON CONTEXTUAL ANALYSIS

CROSS-REFERENCE TO RELATED APPLICATION(S)

This application is a continuation of and claims the benefit of priority to U.S. patent application Ser. No. 15/724,473, filed on Oct. 4, 2017, the contents of which are hereby incorporated by reference.

TECHNICAL FIELD

The present disclosure relates to computer-implemented methods, software, and systems for modifying triggered notifications associated with particular user profiles based on an analysis of contexts specific to the user profile and/or related user profiles.

BACKGROUND

Location-based services can be used to enhance mobile applications. For example, information presented by an application or processing performed by an application can be based on or influenced by the location of a mobile device. As a specific example, advertising presented in an application can be based on a mobile device's location, as well as other environmental factors. For example, an advertisement for an establishment can be presented via a mobile application in response to a detection that the mobile device is within a threshold radius of the establishment. When users at a particular location or area share common environmental and/or contextual contexts or statuses, multiple users may trigger the advertisement.

To determine the location of a particular device, a back-end server or mobile application may trigger a request for the current location of the particular device. The request may be in response to a standard location tracking or location association operation, or in response to an event. Additional information associated with the device and/or the user associated with the device can be used to provide further context.

Particular notifications (e.g., push notifications) may be associated with a particular application installed on a mobile device of a user, a particular service provider providing data or phone service to the mobile device, or can otherwise be associated with an external provider or system capable of accessing recent and/or current information about the context of the mobile device.

SUMMARY

The present disclosure involves systems, software, and computer implemented methods for modifying triggered notifications associated with particular user profiles based on an analysis of contexts specific to the user profile and/or related user profiles. A first example system includes a communications module, at least one memory storing instructions, a plurality of user profiles, a repository of notification rules, and a repository of notification modification rules, and at least one hardware processor interoperably coupled with the at least one memory and the communications module. Each user profile is associated with a user device, and the repository of notification rules includes at least one rule set identifying events for triggering notifications to user devices associated with particular ones of the user profiles based on a set of notification requirements. The notification modification rules can identify contextual determinations associated with the particular ones of the user profiles related to the triggered notification, where those rules identify a particular modification to the triggered notification prior to transmission of the triggered notification. At least one notification modification rule identifies modifications to triggered notifications based on a user profile-specific contextual rule. The instructions stored in memory instruct the at least one hardware processor to perform various operations, including, identifying at least one satisfied notification rule for triggering notifications to a user device associated with at least one particular user profile. For each of the at least one particular user profiles, the instructions cause the processor to access the particular user profile to identify at least one user-specific contextual rule corresponding to the at least one notification modification rules and identify a current user context associated with the particular user profile. In response to determining that the identified current user context associated with the particular user profile satisfies the at least one user-specific contextual rule and before the notification is transmitted, the instructions instruct the processor to modify the triggered notification for the particular user profile based on the particular modification associated with the satisfied at least one user-specific contextual rule. In response to determining that the identified current user context associated with the particular user profile does not satisfy the at least one user-specific contextual rule, the instructions cause the process to transmit, via the communications module, a first signal to the user device associated with the particular user profile, the first signal including the triggered notification.

Implementations can optionally include one or more of the following features.

In some instances, modifying the triggered notification for the particular user profile comprises cancelling the triggered notification prior to transmission. In other instances, modifying the triggered notification for the particular user profile comprises modifying contents of the triggered notification prior to transmitting the triggered notification.

In some instances, the instructions further instruct the at least one hardware processor to transmit, via the communications module, a second signal to the user device associated with the particular user profile, the second signal including the modified notification in response to modifying the triggered notification for the particular user profile.

In some instances, the user-specific contextual rule set includes at least one location-specific rule, wherein the user-specific contextual rule is satisfied when the user device associated with the user profile is determined to be at a location associated with the at least one location-specific rule. In those instances, modifying the triggered notification for the particular user profile can comprise delaying transmission of the triggered notification until the user device associated with the user profile is determined to be at a location not including the locations associated with the at least one location-specific rule. In other instances, modifying the triggered notification for the particular user profile can comprise cancelling the triggered notification without transmission in response to determining that the user device associated with the user profile to be a location associated with the at least one location-specific rule.

In some instances, the user-specific contextual rule set includes at least one time-specific rule defining a time in which the user profile is not to receive notification, where the at least one time-specific rule is satisfied when the triggered notification is triggered at a time corresponding to a particular time or time range associated with the time-specific rule associated with the user-specific contextual rule set.

In some instances, the user-specific contextual rule set includes a rule defining a maximum number of notifications received over a period of time. In those instances, determining that the identified current user context associated with the particular user profile satisfies the rule associated with a number of notification received over a period of time can comprise analyzing historical data associated with the particular user profile to determine whether the user device has received a number of notifications equal to or greater than the maximum number of notifications over the period of time. In response to determining that the user device has received the number of notifications equal to or greater than the maximum number of notifications over the defined period of time, modifying the triggered notification for the particular user profile can comprise cancelling the triggered notification without transmission. In other instances, in response to determining that the user device has received the number of notifications equal to or greater than the maximum number of notifications over the defined period of time, modifying the triggered notification for the particular user profile can comprise delaying transmission of the triggered notification until after the defined period of time has expired.

In some instances, identifying the current user context associated with the particular user profile can comprise receiving, via the communications module, a third signal from the user device associated with the particular user profile. In other instances, identifying the current user context associated with the particular user profile can comprise receiving, via the communications module, a third signal from an external source different than the user device, the external source providing information related to the user associated with the particular user profile.

In some instances, the triggered notification may be a push notification associated with a particular application installed on the user device associated with the particular user profile.

In some instances, the user-specific contextual rule set includes a rule to suppress triggered notifications based on an analysis of a transactional history associated with the particular user profile, where the rule is satisfied in response to a determination that the particular user profile is associated with a transaction within a period of time prior to a triggering of the triggered notification.

A second example system includes a communications module, at least one memory storing instructions, a plurality of user profiles, a repository of notification rules, and a repository of notification modification rules, and at least one hardware processor interoperably coupled with the at least one memory and the communications module. Each user profile is associated with a user device, and the repository of notification rules include at least one rule set identifying events for triggering notifications to user devices associated with particular ones of the user profiles based on a set of notification requirements. The notification modification rules are associated with contextual determinations related to particular ones of the user profiles associated with triggered notifications, where the notification modification rules identify a particular modification to particular triggered notifications to be performed prior to transmission of the triggered notifications. At least one notification modification rule identifies modifications to triggered notifications based on a relative user context-specific contextual rule. The instructions stored in memory instruct the at least one hardware processor to perform various operations, including, identifying at least one satisfied notification rule for triggering a notification to a user device associated with at least one particular user profile. For each of the at least one particular user profiles, the instructions instruct the processor to identify a current user context associated with the particular user profile and a set of current user contexts associated with at least one user profile different than the particular user profile, where a combination of the identified contexts representing a relative user context. In response to determining that the relative user context satisfies at least one of the relative user context-specific contextual rules, the instructions instruct the processor to modify the at least one triggered notification for the particular user profile based on the particular modification associated with the satisfied at least one relative user context-specific contextual rule. In response to determining that the relative user context does not satisfy at least one of the rules in the relative user context-specific contextual rule set, the instructions instruct the processor to transmit, via the communications module, a first signal to the user device associated with the particular user profile, the first signal including the triggered notification.

Implementations can optionally include one or more of the following features.

In some instances, modifying the triggered notification for the particular user profile comprises cancelling the triggered notification prior to transmission. In other instances, modifying the triggered notification for the particular user profile comprises modifying contents of the triggered notification for the particular user profile prior to transmitting the triggered notification.

In some instances, the current user context associated with the particular user profile is associated with a particular location of the user device associated with the particular user profile, wherein the current user contexts associated with the at least one user profile different than the particular user profile are each associated with a corresponding location. In those instances, at least one relative user context-specific contextual rule can comprise performing a modification of the triggered notification in response to a determination that more than a threshold number of the user profiles in the relative user context are associated with a common location at a time when the triggered notification is to be transmitted. In some instances, the common location comprises a common location relative to the other user profiles. In some of those instances, the common location relative to the other user profiles comprises an area of a predetermined size, where the at least one relative user context-specific contextual rule is satisfied in response to more than the threshold number of user profiles being located within the common location at a time when the triggered notification is to be transmitted.

In some instances, the common location can comprise a predefined geographical area, where the at least one relative user context-specific contextual rule is satisfied in response to more than the threshold number of user profiles being located within the predefined geographical area at a time when the triggered notification is to be transmitted.

In some instance, in response to the relative user context-specific contextual rule being satisfied, modifying the triggered notification comprises identifying a subset of the user profiles associated with the common location to receive the triggered notification and, for each of the subset of the user profiles to receive the triggered notification, transmitting, via the communications module, a set of second signals to the user devices associated with each user profile of the subset, each second signal including the triggered notification. For each of the user profiles not included in the identified subset of the user profiles, the triggered notification is cancelled prior to transmission.

In some instances, the triggered notification comprises a push notification associated with a particular application installed on the user device associated with the particular user profile.

In some instances, identifying the at least one satisfied notification rule for triggering the notification to the user devices associated with the at least one particular user profile comprises identifying a common notification rule being satisfied for a plurality of user profiles, where the relative user context identifies the plurality of user profiles associated with the triggered notification, and where the relative user context-specific contextual rule identifies a maximum number of user profiles allowed to receive the triggered notification. In those instances, modifying the triggered notification can comprise identifying a subset of the plurality of user profiles associated with the at least one satisfied notification rule, the subset less than or equal to the maximum number of user profiles allowed to receive the triggered notification, and, for each of the subset of the user profiles to receive the triggered notification, transmitting, via the communications module, a set of second signals to the user devices associated with each user profile of the subset, each second signal including the triggered notification. For each of the user profiles not included in the identified subset of the user profiles, the triggered notification can be cancelled prior to transmission.

A third example system includes a communications module, at least one memory storing instructions, a plurality of user profiles, a repository of notification rules, and a repository of notification modification rules, and at least one hardware processor interoperably coupled with the at least one memory and the communications module. Each user profile is associated with a user device, and the repository of notification rules include at least one rule set identifying events for triggering notifications to user devices associated with particular ones of the user profiles based on a set of notification requirements. The notification modification rules are associated with contextual determinations related to particular ones of the user profiles associated with triggered notifications, where the notification modification rules identify a particular modification to particular triggered notifications to be performed prior to transmission of the triggered notifications. At least one notification modification rule identifies modifications to triggered notifications based on a location-specific contextual rule. The instructions stored in memory instruct the at least one hardware processor to perform various operations, including, identifying at least one satisfied notification rule for triggering notifications to a user device associated with at least one particular user profile. For each of the at least one particular user profiles, a current user context associated with the particular user profile is identified, where the current user context identifies a particular location associated with the particular user profile. In response to determining that a particular current location associated with the particular user profile satisfies at least one location-specific contextual rule before the notification is transmitted, the instructions instruct the processor to modify the triggered notification for the particular user profile based on the particular modification associated with the satisfied location-specific contextual rule. In response to determining that the identified current user context associated with the particular user profile does not satisfy at least one location-specific contextual rule before the notification is transmitted, the instructions instruct the processor to transmit, via the communications module, a first signal to the user device associated with the particular user profile, the first signal including the triggered notification.

Implementations can optionally include one or more of the following features.

In some instances, the particular location associated with the particular user profile comprises a particular location of the user device associated with the particular user profile. In those instances, the particular location of the user device associated with the particular user profile can comprise a current location of the user device at a time at which the at least one notification rule is satisfied. The determination of whether the at least one location-specific contextual rule is satisfied can be based on the time at which the at least one notification rule is satisfied. In other instances, the particular location of the user device associated with the particular user profile can comprise a current location of the user device at a time when the triggered notification is to be transmitted, where the determination of whether the at least one location-specific contextual rule is satisfied is based on the time at which the triggered notification is to be transmitted. In other instances, the particular location of the user device associated with the particular user profile comprises a location history of the user device, and wherein the at least one location-specific contextual rule is satisfied based on an analysis of the location history associated with the user profile.

In some instances, the at least one location-specific contextual rule is associated with a defined location, where the at least one location-specific contextual rule is associated with a specific time range during which the at least one location-specific contextual rule is valid. In those instances, in response to determining that the particular location associated with the particular user profile corresponds to the defined location at a time outside the specific time range associated with the at least one location-specific contextual rule, the at least one location-specific contextual rule is not satisfied. In some instances, the defined location is associated with an event. In those instances, the instructions instruct the at least one hardware processor to receive, via the communications module, a second signal including status information from a data feed associated with the event, where the status information can be used to determine whether the event is ongoing. The at least one location-specific rule is then satisfied when the triggered notification is to be transmitted while the event is ongoing. In some of these instances, modifying the triggered notification for the particular user profile can comprise delaying transmission of the triggered notification to the user device associated with the particular profile until after obtaining, via the communications module, information from the data feed indicating that the event has ended. In other of these instances, modifying the triggered notification for the particular user profile can comprise delaying transmission of the triggered notification to the user device associated with the particular profile until after obtaining, via the communications module, information from the data feed indicating that the event is at an intermission or break. In some instances, the data feed associated with the event comprises a social media feed.

In some instances, modifying the triggered notification for the particular user profile comprises delaying transmission of the triggered notification. In those instances, transmission of the triggered notification can be delayed until a time when the location of the current user context associated with the particular user profile does not satisfy the location-specific contextual rule.

Similar operations and processes may be performed in a system comprising at least one process and a memory communicatively coupled to the at least one processor where the memory stores instructions that when executed cause the at least one processor to perform the operations, including where alternative or additional components or operations are performed and/or included, or where fewer than those components are present. Further, a non-transitory computer-readable medium storing instructions which, when executed, cause at least one processor to perform the operations may also be contemplated. In other words, while generally described as computer implemented software embodied on tangible, non-transitory media that processes and transforms the respective data, some or all of the aspects may be computer implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DETAILED DESCRIPTION

Figure 1:
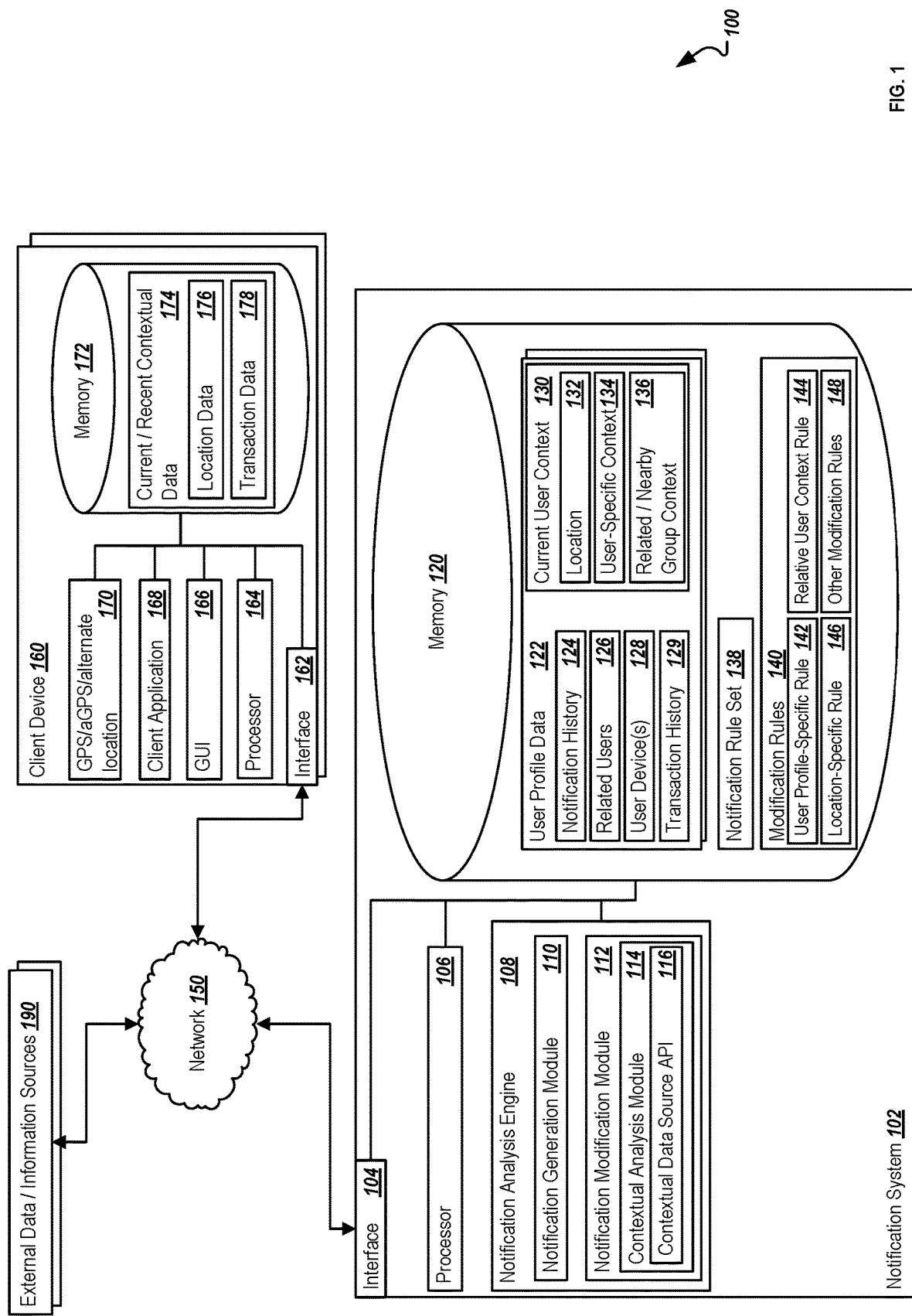
FIG. 1 is a block diagram illustrating an example system for triggering notifications associated with one or more user profiles and evaluating whether those triggered notifications are to be modified in response to one or more modification rules.

Current mobile applications and service providers associated with a user and mobile devices offer various push notifications or other notifications triggered in response to any number of factors. In some instances, users may be registered with the mobile application, either to enjoy the full functionality of the application, or in order to receive additional tools or uses of the application. For service providers and advertisers, particular users may register with the provider/advertiser or be existing customers, such that periodic advertisements sent via a push notification or via a standard messaging format (e.g., SMS, etc.) may be sent. In other instances, mobile applications installed on a particular device may be able to receive, from a backend notification system, a particular message to be pushed to the user on the mobile device.

A problem with many current notification systems is that they fail to consider individual or contextual circumstances outside of the notification triggering requirements themselves. For example, in response to a national news event, a news application such as a CNN app may initiate, via a backend system associated with the app, a push notification to subscribers and registered users. However, contexts specific to particular users may mean that such notifications are not welcome at a particular time or place on the user's device, such as when those users are in a meeting, at an event, or another location, or based on other contextual parameters. As another example, the throttling, delaying, or cancelling of particular triggered notifications can be valuable when sending those notifications may be otherwise inappropriate. For example, during standard business hours and while a number of other users at a location is low, users visiting a wedding reception hall may receive an offer for a loan to assist in paying for any wedding-related expenses. However, sending similar offers on Fridays and Saturdays during potential wedding hours (and, additionally or alternatively, when many persons or users are at the location) may be inappropriate, as persons attending the wedding may not need or want wedding loans or disruptions during the ceremony and party.

In other instances, the push notification provider may have a set of notifications that are triggered when users arrive at a particular location, such as a particular restaurant or area of a city. Most notification rules may automatically trigger these notifications as users arrive to the location, such as where the notifications relate to particular discounts, or to otherwise boost engagement with customers/users. However, in times of a rush, heavy traffic, or other unusual amounts of persons present, triggering the notification automatically may be problematic for a number of reasons. In one instances, multiple individuals receiving the same notification at the same time may reduce each individual's perception of unique or special selection and privilege relative to their peers, such as where the notification relates to an advantageous rate on a new loan or other financial service.

To alleviate the drawbacks of the problems mentioned above, and to enhance push notification systems and their contextual awareness, a dynamic notification engine is described herein where push notifications and other messages to be send to a user or group of users can be throttled (e.g., cancelled, delayed, or otherwise modified) based on a contextual analysis performed at a time when the push notification is triggered or at a time at which the push notification is to be transmitted to user devices of those users. In doing so, the subject matter of the push notification (e.g., a targeted offer) can be perceived to retain the qualities of personalization and relevance used to optimize the probability of the offer being acted on. Further, the contextual analysis of the current situation of the user, including the location of the user, as well as relative impact the notification may have on one or more other users, including those also targeted to receive the notification, further provides a more nuanced analysis of the notification itself associated with such automatic triggering.

The present solution is unique and different from existing solutions centered solely upon pushing notifications to customers without consideration of the effects of over-pushing notifications or inappropriately pushing notifications to customers. For example, current solutions fail to consider the sensitivities of customers and potential customers, and how those customers may be affected by a commercial entity sending notifications to them at inappropriate times or without considering the uniqueness of a particular customer or situation. Although some existing methods may exist to limit, for example, the number of notifications sent per time period, this is not done in an automated way wherein the behaviors of users are studied and relationships are made to derive such limitations which induce an optimal response from an entity's customers. For each of the particular throttling and notification modification methods described herein, there is likely an optimal value or range of values past which the likelihood of customer responses is not optimized, instead lowering than it could be due to over-pushing or other affects. By determining optimal levels of notifications, notifications which are automatically triggered based on some event or in response to some trigger may be throttled accordingly.

Multiple examples of potential throttling and/or modification of triggered notifications can be included herein. As described herein, three general types of modification rules may be applied to particular contextual situations. These modification rule types may be considered separately, or the rule types may overlap in some implementations to be analyzed in combination. Additional contextual rule sets and types outside of these may be considered in the context of the present solution. The three primary context types described herein relate to (1) contexts in which a user-specific context is considered, (2) contexts in which a user's current context is considered in relation to one or more other users, and (3) contexts where users are at a particular location, where the location, or an event occurring at or associated with the location, is analyzed.

Example notification modification rules may be based on one or more of the following:

- In relatively dense areas, push notifications may be provided to every $n^{th}$ customer in the area to avoid widespread spamming of similarly-situated individuals.
- A recent history of a particular user's location may be analyzed for a total time spent in a particular area or based on a prior location visited by the user. In doing so, a push notification may be allowed only where a customer spends a particular amount of time in an area, or in response to a particular prior location being visited.
- Some messages may be triggered based on a particular user's presence in an area. A notification modification rule may determine whether a particular (or threshold) number of other users or persons are also within the area. The triggered notification associated with the particular user's presence in the area may be throttled (e.g., cancelled in this instance) when more than the particular number of users are present. In such instances, the relative user context indicates that a situation associated with the triggered notification may not be appropriate when more than the threshold number of users or persons are present.
- Push notification limits can be enforced on a per-user basis, even where particular notification triggers occur generally and automatically. Prior to the triggered notification being sent, a history of notifications received within a particular period of time specific to the user can be analyzed. In some instances, further notifications can be cancelling when a threshold number of notifications have already been received by the user. Alternatively, notifications may be associated with a particular tag, type, or other identifier. Entities can identify limits on particular types of messages to be sent. When a notification of a particular type is triggered, the modification rule can be used to determine whether that particular type of notification has already been received by the user within a particular period, and if so, can cancel or delay the notification prior to transmission.
- User notification histories can be used in other instances to shape or otherwise modify the contents of a particular triggered notification. For example, a list of available push notifications may be triggered for a particular zone or location, with each of the notifications being associated with a particular percentage of use adding to 100%. Using a history of the particular notification received previously for a user, future notifications can be modified to ensure that the percentage is met while also avoiding duplicative notifications.
- In some instances, relatively generic notifications can be throttled based on additional modification rules using user profile requirements or other considerations prior to particular triggered notifications being transmitted. For example, mobile financial application users may be associated with a triggered notification based on a determination that they have simply arrived at a location of the financial institution providing the application. However, such notifications may be tailored specifically to high net worth individuals, or individuals with (or without) particular types of existing loans or other financial products. A modification rule can be set to analyze the particular user profile associated with the triggered notification to determine whether the current context of the user profile meets the requirements of a modification rule associated with the notification. If the user profile should receive the triggered notification, the notification is sent. If the user profile does not meet the additional requirements, then the notification can be modified according to the modification rule (e.g., cancelled or otherwise modified).
- Some modification rules may determine that a particular location at which the user profile is located at the time the notification is triggered or to be transmitted is associated with a modification rule. For example, a worship site (e.g., a church, a synagogue, a mosque, etc.) may be associated with a delay or suppression modification rule. Similarly, an opera house, concert hall, or sporting event may also be associated with similar rules. In response to determining that the context of the user profile set to receive the notification is associated with a particular location, then the modification rule can stop and/or delay transmission of the triggered notification based on this information.

Any number of suitable modification rules can be defined in different implementations, and can in fact take various types of contextual information into account about a particular user profile, a group of user profiles, and/or a location or area associated with the current context of a user profile. Sources of information relevant to the modification rules can include information received from the user device associated with one or more user profiles (e.g., smartphones), social network postings (e.g., Facebook check-ins, status updates, etc.), information from one or more other applications or backend systems (e.g., a financial transaction system providing information on recent transactions, location information derived from another application or detected by another system), or any other suitable information source.

Advantages of the described solution are numerous. For example, the present solution allows a check on triggered notifications prior to sending, such that notifications triggered for any reason can be compared to a contextual understanding of a particular user's situation, availability, and preference to receive a communication. Further, the context considered may be more than just a particular user's context, but instead an analysis of one or more other users in the particular user's vicinity. In doing so, specific considerations can be added to a standard notification prior to transmission based on an overall context of a current situation, not just on a particular user profile. By using a contextual rules engine and analysis, notification providers can add a further layer of intelligence into their notification systems, and users can avoid unnecessary and unwarranted communications. Further, by adding the modification rules on a layer on top of and apart from the notification rules causing the particular notification to be triggered, the modification rules can provide a more generic layer of consideration for triggered notifications without the need to specifically program and/or modify existing notification rules. Custom notification modification rules can be developed that are user specific and that can be layered on top of a more general notification layer. Additionally, general notification rules can be modified or otherwise extended to provide user-specific rule implementations. Other advantages include the ability to automatically generate rules by analyzing user profile data and developing rules which maximize the probability of the user acting upon a notification, such as by evaluating user actions in response to particular notifications. Information associated with the user profile at the time of those prior notifications can be used to determine how to define particular modification rules. In one example, a system that may generate such a rule may be an AI or machine learning algorithm.

Turning to the illustrated example implementation, FIG. 1 is a block diagram illustrating an example system 100 for triggering notifications associated with one or more user profiles and evaluating whether those triggered notifications are to be modified in response to one or more modification rules. Specifically, the illustrated system 100 includes or is communicably coupled with a notification system 102, a client device 160, one or more external data or information sources 190, and a network 150. System 100 is a single example of a possible implementation, with alternatives, additions, and modifications possible for performing some or all of the described operations and functionality. Although shown separately, in some implementations, functionality of two or more systems or servers may be provided by a single system or server. In some implementations, the functionality of one illustrated system or server may be provided by multiple systems, servers, or computing devices, including those physically or logically local or remote to each other. Any combination or permutation of systems may perform the functionality described herein.

As used in the present disclosure, the term "computer" is intended to encompass any suitable processing device. For example, client device 160, notification system 102, and the external data or information sources 190 may be any computer or processing device (or combination of devices) such as, for example, a blade server, general-purpose personal computer (PC), Mac®, workstation, UNIX-based workstation, embedded system or any other suitable device. Moreover, although FIG. 1 illustrates particular components as a single element, those components may be implemented using a single system or more than those illustrated, as well as computers other than servers, including a server pool or variations that include distributed computing. In other words, the present disclosure contemplates computers other than general-purpose computers, as well as computers without conventional operating systems. Client device 160 may be any system which can request data, execute an application, and/or interact with the notification system 102. The client device 160, in some instances, may be any other suitable device, including a mobile device, such as a smartphone, tablet, smartwatch, or any other mobile computing device. In general, each illustrated component may be adapted to execute any suitable operating system, including Linux, UNIX, Windows, Mac OS®, Java™, Android™ Windows Phone OS, or iOS™, any real-time OS among others.

The notification system 102 can perform functionality associated with identifying when one or more notifications (e.g., push notifications, text messages, social media posts, etc.) are to be triggered in association with one or more user profiles. Additionally, and separate from the initial triggering of particular notifications, the notification system 102 can obtain or access additional contextual information associated with particular users to apply one or more modification rules. The modification rules can use a dynamic contextual engine (i.e., contextual analysis module 114) to determine whether the current context of the particular user associated with a triggered notification, a current context of a plurality of users associated with triggered notifications, or a relative context of a first particular user in light of one or more other users determines that one or more triggered notifications are to be modified. Notification modification can occur in a number of ways, including by suppressing or cancelling a triggered notification, by delaying a triggered notification until the analyzed context has changed (e.g., by placing a notification in a queue, or setting a time to recheck the current context, etc.), or by modifying the contents of a particular triggered notification in response to the analyzed context.

As illustrated, the notification system 102 includes a notification analysis engine 108, where the notification analysis engine 108 can manage both the triggering of the notifications (e.g., by the notification generation module 110) and subsequent modification to those triggering notifications (e.g., by the notification modification module 112). While illustrated as within a single system, such components may be split between two or more systems and servers, and may be operated, managed, or otherwise executed by different entities. In some instances, a third-party system may provide additional information about particular current contexts for users allowing for the notification modification module 112 to be executed, while a first system triggers notifications without specific regard to all contextual considerations using the notification generation module 110. Alternatively, a third-party system or component may trigger notifications in response to an event or other triggering factor, including those not associated with the particular user (e.g., marketing materials sent to a particular contact list via notification). The triggered notification can be provided to the notification modification module 112 where the contextual analysis can be performed and a determination made whether to modify the triggered notification. Alternatively, the notification generation module 110 can request a contextual analysis by the notification modification module 112 and a determination of whether a particular modification rule 140 is satisfied. If no rule is satisfied, then the triggered notification can be transmitted; however, if a modification rule is met, then the notification modification module 112 can perform the modification associated with the satisfied rule.

In some instances, at least a portion of the notification system 102 may be associated with a financial institution such as a bank or credit union, a credit card issuer, or other institutions. Alternatively, at least a portion of the notification system 102 may be associated with one or more goods or service providers, marketers, advertising agencies, social networks, e-mail systems, or any other suitable entity associated with notifications sent to users. At least a portion of the notification system 102 may also be associated with a contextual analysis system used in marketing and business-to-consumer communications, as well as other similar entities providing contextual analyses of registered users. In some instances, the notification system 102 may be a part of a larger backend system associated with particular mobile or client applications, where the notifications being triggered are triggered in association with the functionality of the backend system (e.g., financial product offers to be presented by a financial mobile application, coupons or incentives delivered in association with an eCommerce site and presented by a mobile application associated with that eCommerce site). In other instances, the notification system 102 may be a generic system used by multiple applications to manage push and other types of notifications to users and their corresponding client devices 160, including functionality built into or associated with a mobile operating system. The notification system 102 may be a part of, associated with, or used by retailers, service providers, marketing firms, mobile games, social networks, eCommerce sites, news-based platforms, financial institutions, and any other suitable entity, system, platform, and/or service.

As illustrated, the notification system 102 includes interface 104, processor 106, the notification analysis engine 108, and memory 120. Interface 104 is used by the notification system 102 for communicating with other systems in a distributed environment—including within the environment 100—connected to the notification system 102 and/or network 150, e.g., client device(s) 160, any external data or information sources 190, as well as other systems or components communicably coupled to the network 150. Generally, the interface 104 comprises logic encoded in software and/or hardware in a suitable combination and operable to communicate with the network 150 and other communicably coupled components. More specifically, the interface 104 may comprise software supporting one or more communication protocols associated with communications such that the notification system 102, network 150, and/or interface's hardware is operable to communicate physical signals within and outside of the illustrated environment 100.

Network 150 facilitates wireless or wireline communications between the components of the environment 100 (e.g., between combinations of the notification system 102, client device(s) 160, and/or the external data sources 190, among others) as well as with any other local or remote computer, such as additional mobile devices, clients, servers, remotely executed or located portions of a particular component, or other devices communicably coupled to network 150, including those not illustrated in FIG. 1. In the illustrated environment, the network 150 is depicted as a single network, but may be comprised of more than one network without departing from the scope of this disclosure, so long as at least a portion of the network 150 may facilitate communications between senders and recipients. In some instances, one or more of the illustrated components (e.g., the notification system 102) or portions thereof (e.g., the notification modification module 112) may be included within network 150 as one or more cloud-based services or operations. The network 150 may be all or a portion of an enterprise or secured network, while in another instance, at least a portion of the network 150 may represent a connection to the Internet. In some instances, a portion of the network 150 may be a virtual private network (VPN) or an Intranet. Further, all or a portion of the network 150 can comprise either a wireline or wireless link. Example wireless links may include 802.11a/b/g/n/ac, 802.20, WiMax, LTE, and/or any other appropriate wireless link. In other words, the network 150 encompasses any internal or external network, networks, sub-network, or combination thereof operable to facilitate communications between various computing components inside and outside the illustrated environment 100. The network 150 may communicate, for example, Internet Protocol (IP) packets, Frame Relay frames, Asynchronous Transfer Mode (ATM) cells, voice, video, data, and other suitable information between network addresses. The network 150 may also include one or more local area networks (LANs), radio access networks (RANs), metropolitan area networks (MANs), wide area networks (WANs), all or a portion of the Internet, and/or any other communication system or systems at one or more locations.

The notification system 102 also includes one or more processors 106. Although illustrated as a single processor 106 in FIG. 1, multiple processors may be used according to particular needs, desires, or particular implementations of the environment 100. Each processor 106 may be a central processing unit (CPU), an application specific integrated circuit (ASIC), a field-programmable gate array (FPGA), or another suitable component. Generally, the processor 106 executes instructions and manipulates data to perform the operations of the notification system 102, in particular those related to executing the notification analysis engine 108 and its various modules. Specifically, the processor 106 executes the algorithms and operations described in the illustrated figures, as well as the various software modules and functionalities, including the functionality for sending communications to and receiving transmissions from the client devices 160 and/or the external data or information sources 190, as well as to other devices and systems. Each processor 106 may have a single core or multiple cores, with each core available to host and execute an individual processing thread. In some instances, a cloud-based solution may use one or more remotely or otherwise available processors 106 and their cores to allow for further operations and optimization of operations via parallel processing.

Regardless of the particular implementation, "software" includes computer-readable instructions, firmware, wired and/or programmed hardware, or any combination thereof on a tangible medium (transitory or non-transitory, as appropriate) operable when executed to perform at least the processes and operations described herein. In fact, each software component may be fully or partially written or described in any appropriate computer language including C, C++, Objective-C, JavaScript, Java™, Visual Basic, assembler, Perl®, Swift, HTML5, any suitable version of 4GL, as well as others.

The notification analysis engine 108 may be any application, framework, agent, or other software capable of interpreting particular rules of a notification rule set 138 to generate one or more notifications (i.e., by the notification generation module 110). As illustrated, the notification analysis engine 108 further performs operations subsequent to the triggering of particular notifications, where those operations (i.e., those of the notification modification module 112) determine whether any particular contextual parameters exist as to why the triggered notification is to be modified based on a set of modification rules 140.

The notification generation module 110 may be incorporated into the functionality of the notification analysis engine 108. A first set of contextual information may be used to determine whether a particular notification should be generated or triggered. In some instances, the indication that a particular user is located at a location associated with a notification may trigger the notification. In other instances, a particular transaction performed by the user may trigger the notification. In some instances, a combination of a transaction at a particular location may trigger a notification. Any number of other notification rules may be included in the notification rule set 138, and may be considered by the notification generation module 110 to determine whether notifications are to be triggered. In some instances, particular notifications may be triggered on a predetermined schedule or in response to an external trigger from an entity or person associated with the notification (e.g., a marketing message or communication) without reference or consideration of the one or more users to whom the notification is to be sent. Restated, a notification considered in this solution may be triggered in response to any input, action, event, or reason. In some instances, the notification triggered may be for a single user, while in others the notification may be for a plurality of users. The plurality of users may share some general characteristic, including a determined physical location, a common action or transaction, a common set of registered users associated with a user profile for a particular entity associated with the transaction, or any other shared characteristic. In some instances, such as the situation where a user merely has a registered profile, the connection and commonality may be relatively high level without consideration of particular contextual information specific to a user or to a current relationship between two or more of the users.

Once a notification is triggered, the notification analysis engine 108 uses a notification modification module 112 to perform a specific contextual analysis apart and different from the triggering of the notification. In particular, the notification modification module 112 can perform, for one or more of the users associated with the triggered notification, one or more contextual analyses via the contextual analysis module 114. The contextual analysis module 114 may be a standalone or remote component, or can be part of the notification modification module 112 and/or the notification analysis engine 108.

In general, the contextual analysis module 114 can identify and obtain one or more sources of data particular to individual users and their corresponding user profiles 122. In some instances, the contextual information may be obtained in response to a ping or request for current information from one or more user devices (e.g., client devices 160) associated with the user profile 122 of a particular user associated with a triggered notification. For example, the contextual analysis module 114 can obtain information about the user from data on the client device 160 associated with the user (e.g., location data 176 or transaction data 178), as well as from information associated with the user profile stored in local memory 120 or a remotely accessible data store. The stored information in the user profile may include information about prior notifications received or sent to the particular user (i.e., notification history 124), one or more related users 126, a transaction history 129 associated with the user profile, and one or more user devices 128 associated with the user, where those devices 128 (e.g., client device 160) may be used as a proxy for the location associated with user profile 122, and may also be used to identify particular end points for the triggered notifications when transmitting the notifications. More than one user device 128 may be identified in the user profile 122, such as for a tablet and a smartphone. A primary device may be identified, or the most recent device in use may be used as the device for determining a current location, in some instances. Other suitable information can also be stored or associated with the user profiles 122. At least some of the information can be stored as a current user context 130. In some instances, a time series of user contexts 130 may be kept or archived to provide information related to a particular user profile 122 over time.

As illustrated in FIG. 1, the current user context 130 includes a current location 132 associated with the user profile (e.g., based on one or more transactions or based on locational data received from the client device 160 or other data source), additional user-specific context 134 (which may include social media-related information, such as posts or other user input, social media check-ins, interactions with one or more devices or systems (e.g., a particular Wi-Fi network or set of networks), prior interactions with particular applications or functionality, etc.), and information about a related or nearby group context 136, which may include information about relatively nearby (e.g., within local communication distance) of one or more other users. In some instances, the nearby group context 136 can be determined after information associated with a plurality of registered users associated with user profiles has been obtained, such that a relative or absolute location of multiple users can be determined. Based on this information, a relative location of those other users can be identified and a relative user context can be maintained. In some instances, at least a portion of the current user context 130 may be obtained on a periodic basis regardless of the notifications being triggered, while in other instances, portions of the current user context 130 may be obtained directly as a result of a notification being triggered for the particular user profile 122.

As illustrated, the contextual analysis module 114 includes a contextual data source application programming interface (API) 116. The contextual data source API 116 can be used to obtain contextual information associated with particular user profiles 122 from one or more sources external from the client device 160 itself and/or that is not available from the user profile 122. In some instances, a unique identifier may be associated with the particular user profile 122 of a particular user may be provided to the contextual data source API 116. Using the interface 104 and network 150, requests for additional contextual information associated with the uniquely identified user profile 122 can be submitted via the API 116, which may be associated with one or more external data sources 190. In one example, particular social network information may be obtained, including current status and interaction information, as well as other relevant information. Further, information associated with activities and interactions with one or more other entities other than the entity associated with the triggered notification may be obtained. Such information can be used to provide information on the location, movement, and activities of the particular user, as well as additional context to the already obtained or available information within the user profile. The contextual data source API 116 can be used in associated with multiple different external data or information sources 190, which are not meant to be limiting to particular services. Alternative, multiple APIs or other connections may be available to other data sources to request similar information.

Once the current user context 130 is generated, the notification modification module 112 can determine whether one or more of the modification rules 140 has been satisfied prior to transmitting the triggered notification. As illustrated, the modification rules 140 contain different types of rules as examples, including user profile-specific rules 142, relative user context rules 144 (e.g., based on the user's current context in light of the current contexts of one or more other users or persons), location-specific rules 146, and other modification rules 148. Each of the rules can include a set of contextual parameters where the rule is satisfied and a corresponding modification action to be performed in such instances. The modification actions may include full suppression or cancellation of a triggered notification, as well as modifying particular contents of the triggered notification. In some instances, the modification rules 140 may be evaluated at a time the notification is triggered, or alternatively, they can be evaluated at a time just prior to when the notification is to be transmitted.

User profile-specific rules 142 can be specifically associated with particular user profiles. In some instances, users may provide explicit information about when notifications are allowed. For example, the user may specify that no notifications should be received during work hours and/or at a particular location. Alternatively, user profile-specific rules 142 can be generated automatically based on success or failure rates of particular notifications. For example, if a user's pattern of behavior indicates that notifications including offers during a certain time range are ignored above a particular threshold, then a corresponding user profile-specific rule 142 can created for that time range and used for future notifications. In some instances, the user profile-specific rules 142 may be associated with a particular threshold for a number of messages received over a period of time. Using a user's specific notification history 124, the user profile-specific rule 142 can determine whether the threshold number of messages has been met for a particular time period. That threshold may be based on notifications from a particular entity, or that threshold may be based on notifications received from two or more different or related entities. User profile-specific rules 142 can be uniquely defined or associated with a single user profile 122, while in other instances user profile-specific rules 142 can be measured in isolation against only information associated with the single user profile 122 (e.g., other user profiles are not considered). Another example of a user profile-specific rule 142 may include an evaluation or determination that the user profile was associated with a recent transaction associated with an entity related to the triggered transaction. If so, the triggered notification may be cancelled or delayed in order to avoid oversaturating the user with notifications that may not be relevant after completing a related transaction. In some instances, a user-specific rule may be based on one or more planned or scheduled actions associated with the user. For example, a user may indicate, explicitly or through prior actions, that he or she intends to take a particular train. The present solution could incorporate external contextual information along with a current user context to generate the user-specific context. For example, where a user is going to catch a train for work in the morning, the user's location and current or expected movements may be known. Based on the travel time to the train station, the system can determine whether the user's current location and the time to the train station provide a correct amount of time prior to the particular train arriving. In some instances, where the time to arrive may leave less than a threshold amount of time for the user to arrive, one or more generic triggered notifications can be throttled or otherwise suppressed to avoid distraction to the user. Alternatively, or in combination, notifications associated with a particular topic, here, the status of the train to be caught (e.g., updated arrival time, information that the train has already left), may be allowed to be transmitted to the user.

The relative user context rules 144 can include rules where contexts associated with a group of user profiles are evaluated. In some instances, a single user's current context is evaluated against a group of other users for determining the relative user context and the application of any associated relative user context rules 144. In one example, a particular relative user context rule 144 may identify that a plurality of users are at a common location. In response to this determination, a triggered notification can be suppressed, such as where the notification relates to an offer meant to be prestigious or otherwise unique. In some instances, the plurality of other users may all be associated with triggered notifications, or they may not be. In some instances, the relative user context rule 144 may consider whether those nearby users are also associated with a triggered notification. If they are not, the notification may still be transmitted. If they are associated with similar triggered notifications, however, at least some of those notifications may be suppressed to avoid removing the prestige of the included offer. In some instances, the relative user context rule 144 can include parameters for suppressing or cancelling only a portion of the triggered notifications associated with the group of users. For example, the relative user context rule 144 may indicate that only 10% of the group, when reaching a particular size, may still receive the triggered notification that would have otherwise been provided to each of the users. In those instances, the notification modification module 112 can identify the appropriate user profiles 122 still to receive the triggered notification and those that should not. The module 112 can then suppress or otherwise cancel those triggered notifications associated with users who will not receive the notification.

In some instances, the relative user context rule 144 may be based on a determination that the different users are in a common or same location. In some instances, the rule may specify a relative location to other users receiving the notification, such that the absolute location does not matter. For example, a notification may be triggered regarding a prestigious loan product. However, a relative user context rule 144 may be satisfied where more than five (5) users associated with the triggered notification are within a particular distance, area, or range relative to one another. Therefore, that specific rule 144 may be satisfied while the associated users are at a restaurant, at an event, are on the street walking, or any other location where they are relatively near or within the vicinity of one another. In a different instance, the common location may be a predefined location, such as a particular location, store, event space, meeting, or other location. As such, when a particular number of users are at that predefined location, the rule 144 may be satisfied.

The location-specific rules 146 can be associated with particular locations, where these rules can be used for a plurality of users. In some instances, such location-specific rules 146 can identify an area, a business, a venue, a neighborhood, place of worship, or any other location. The location-specific rules 146 associated with these locations can be used to determine whether a current context of a particular user profile or set of user profiles are associated with or located at the particular location included in the location-specific rule 146. In some instances, the user profile can be associated with the location of a user device associated with the user profile. Alternatively, the location associated with the user profile may be determined based on a recent transaction of a transaction history 129 associated with the user profile, or alternatively, information obtained from one of the external data or information sources 190. The location-specific rule 146 may identify a location and a time range associated with the location during which the rule can be satisfied. Outside of the time range, the particular rule 146 cannot be satisfied. Similarly, particular locations may be associated with one or more events, such as sporting events, performances (e.g., concerts), weddings, etc. In those instances, the particular locations may be associated with event-specific time ranges, where the location-specific rule 146 may only be satisfied while an event at that location is ongoing. The contextual analysis module 114 can access social media feeds, running time information, game-related descriptions, and other information to consider when the event is ongoing. Still further, some of these events may be associated with breaks or intermissions. The contextual analysis module 114 obtains information identified at specific times when these breaks/intermissions occur, or determine, based on obtained information, when attendees are taking said break. In some instances, such a determination may trigger the sending of one or more delayed notifications.

For some or all rules 140, the modifications occurring when the modification rule 140 is satisfied may be used to enact a delay of the triggered notification. For example, in the location-specific rule 146 example, the triggered notification may be delayed until the particular user profile is no longer at or associated with the particular location. The notification modification module 112 may make periodic checks of the current user context 130 to determine whether the location has changed, and, in response to that determination that the location-specific rule 146 is no longer satisfied, the module 112 can allow the delayed notification to be transmitted. In some instances, delayed notifications may be held in a queue for a period of time while the current user context 130 satisfies the modification rule 140. In some instances, the delay may be indefinite and the notification may be held until the context is changed and the modification rule 140 is no longer satisfied. In other instances, after a delay period, the triggered notification may be cancelled once a time limit (e.g., default value or defined as part of the rule 140) is exceeded.

As noted, any suitable modification rule 140 can be defined and used in the present solution. The other modification rules 148 represent those rules, as well as rules which incorporate various aspects of the user profile-specific rules 142, the relative user context rules 144, and the location-specific rules 146.

As illustrated and described, notification system 102 includes memory 120. In some implementations, the notification system 102 includes a single memory or multiple memories. The memory 120 may include any type of memory or database module and may take the form of volatile and/or non-volatile memory including, without limitation, magnetic media, optical media, random access memory (RAM), read-only memory (ROM), removable media, or any other suitable local or remote memory component. The memory 120 may store various objects or data, including caches, classes, frameworks, applications, backup data, business objects, jobs, web pages, web page templates, database tables, database queries, repositories storing business and/or dynamic information, and any other appropriate information including any parameters, variables, algorithms, instructions, rules, constraints, or references thereto associated with the purposes of the notification system 102. Additionally, the memory 120 may store any other appropriate data, such as VPN applications, firmware logs and policies, firewall policies, a security or access log, print or other reporting files, as well as others. As illustrated, memory 120 includes, for example, the plurality of user profiles 122, the notification rule set 138, and the modification rules 140, described herein. Memory 120 may be local to or remote to the notification system 102, and may be available remotely via network 150 or an alternative connection in such instances where not locally available. Further, some or all of the data included in memory 120 in FIG. 1 may be located outside of the notification system 102, including within network 150 as cloud-based storage and data.

The external data sources or information sources 190 may be system, server, or other computing device associated with a particular entity, business, platform, or computing system with which additional contextual information can be derived in association with one or more particular user profiles. In some instances, the contextual analysis module 114 may access these sources in response to a triggered notification. In other instances, the sources 190 may be accessed on a regular basis (e.g., periodically, in response to particular events or actions, etc.), where the obtained information is associated with and/or stored in association with particular user profiles 122. The external data sources or information sources 190 may be associated with a financial institution, a transactional system, a social network, an event tracking system, or any other suitable system, including one or more other mobile applications and application backend systems. In some instances, the external data sources 190 exchange may be associated with a business selling goods or providing services, or a centralized system collecting information about various activities and transactions performed by the user associated with the particular user profile 122.

Illustrated system 100 includes at least one client device 160, and may include a plurality of the client devices 160 in some instances. Each client device 160 may generally be any computing device operable to connect to or communicate within the system 100 via the network 150 using a wireline or wireless connection. In general, the client device 160 comprises an electronic computer device operable to receive, transmit, process, and store any appropriate data associated with the system 100 of FIG. 1. The client device 160 can include one or more client applications, including the client application 168. In some instances, the client device 160 may comprise a device that includes an input device, such as a keypad, touch screen, or other device(s) that can interact with the client application 168 and other functionality, and an output device that conveys information associated with the operation of the applications and their application windows to the user of the client device 160. Such information may include digital data, visual information, or a graphical user interface (GUI) 166, as shown with respect to the client device 160. In general, client device 160 comprises an electronic computer device operable to receive, transmit, process, and store any appropriate data associated with the environment 100 of FIG. 1. In particular, the client devices 160 are devices associated with particular user profiles 122 within or associated with the notification system 102, and to which one or more triggered notifications may be delivered (e.g., via the client application 168) and presented (e.g., via GUI 166).

Client application 168 can be any type of application that allows the client device 160 to request and view content on the client device 160. In some instances, client application 168 may correspond with one or more backend applications or functionality, including an application or platform associated with the notification system 102. Users may interact with the client application 168 to make purchases, review user accounts, interact with friends, participate in social networks, view multimedia, or any suitable function. In some instances, the client application 168 may be an agent or client-side version of the one or more applications or services running on a backend system, such as an agent or client-side version of the applications and systems using or associated with the notification system 102. In the present solution, the triggered notifications transmitted to the client device 160 can be presented via functionality associated with the client application 168. In many instances, the client device 160 may be a mobile device, including but not limited to, a smartphone, a tablet computing device, a laptop/notebook computer, a smartwatch, or any other suitable device capable of interacting with the notification system 102 and/or any other suitable systems or networks. One or more client applications 168 may be present on a client device 160, and can provide varying functionality. In some instances, client application 168 may be a web browser, mobile application, cloud-based application, or dedicated remote application or software capable of interacting with at least some of the illustrated systems via network 150 to request information from and/or respond to one or more of those systems.

In some instances, the client application 168 may be to provide information about a particular context of the client device 160 back to the notification system 102. Such information may include particular operations, transactions (e.g., transaction data 178), and location data 176 monitored or obtained by the client device 160 during its functionality. The location data 176 may be obtained via a global positional system (GPS) 170, an assisted GPS, or another suitable location identifier associated with the client device 160. The GPS 170 may be a specific chip or component providing location information, or may be functionality associated with a particular client application 168 or operating system allowing the client device 160 to identify or determine information needed to provide or derive the particular absolute or relative location of client device 160. For example, the client application 168 and/or functions of the device's operating system may report particular location-related information back to the notification system 102 for the user profile 122, including available Wi-Fi networks, particular coordinates, and identified iBeacons or wireless connections (e.g., Bluetooth devices, RFID readers, NFC readers, etc.). That information can then be used by the notification system 102 to derive a particular location at which the client device 160 is located. Similarly, the client application 168 may provide information about particular transactions via the transaction data 178, both specific to the client application 168, as well as transactions performed by other applications and/or other operating system functionality. The transactions shared may be financial transactions, data exchanges, wireless connections made or identified, or any other suitable information. The location data 176 and the transaction data 178, as well as any other information obtained or available to the client device 160, can be used to define a local set of contextual data 174 for the client device 160. That data can be periodically provided to the notification system 102, including in response to a notification being triggered.

As illustrated, the client device 160 may also include an interface 162 for communication (similar to or different from interface 104), a processor 164 (similar to or different from processor 106), memory 172 (similar to or different from memory 120), and GUI 166. GUI 166 can interface with at least a portion of the environment 100 for any suitable purpose, including generating a visual representation of the client application 168, presenting a pop-up or push notification or preview thereof, or any other suitable presentation of information. GUI 166 may also be used to view and interact with various Web pages, applications, and Web services located local or external to the client device 160, as well as information relevant to the client application 168 and any received notifications sent from the notification system 102. Generally, the GUI 166 provides the user with an efficient and user-friendly presentation of data provided by or communicated within the system. The GUI 166 may comprise a plurality of customizable frames or views having interactive fields, pull-down lists, and buttons operated by the user. For example, the GUI 166 may provide interactive elements that allow a user to view or interact with information related to the operations of processes associated with the notification system 102 and any associated systems, including those associated with or connected to notification system 102, among others. In general, the GUI 166 is often configurable, supports a combination of tables and graphs (bar, line, pie, status dials, etc.), and is able to build real-time portals, application windows, and presentations. Therefore, the GUI 166 contemplates any suitable graphical user interface, such as a combination of a generic web browser, a web-enabled application, intelligent engine, and command line interface (CLI) that processes information in the platform and efficiently presents the results to the user visually.

While portions of the elements illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

Figure 2:
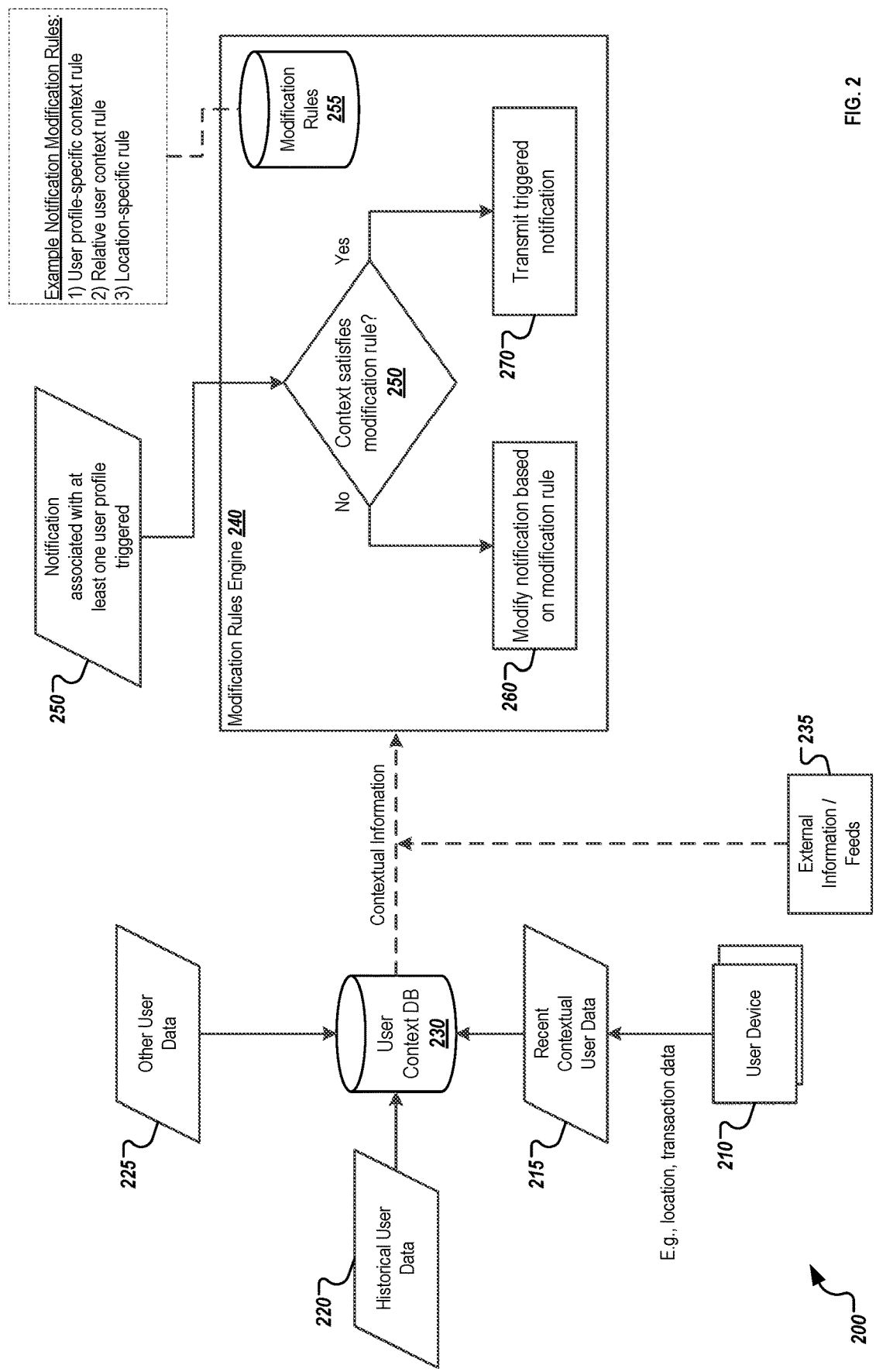
FIG. 2 is an example diagram of a data flow associated with a notification modification analysis.

FIG. 2 is an example diagram 200 of a data flow associated with a notification modification analysis. The diagram provides an example set of operations and interactions to identify a current user context and, in response to a notification being triggered, determine whether one or more modification rules apply to a particular user profile and/or a particular notification.

Information about particular user profiles can be collected at a centralized user context database 230. The information maintained or associated with the user context database 230 can be associated with particular user profiles, where those user profiles are associated with particular user devices 210. Over time, or in response to a notification being triggered, information from a number of sources may be considered to determine a current context associated with a particular user profile. The current context may be based on a single user profile specifically, or may be determined or set in reference to one or more related user profiles. The user mobile devices 210 can provide, for instance, current and recent location data to identify a particular location of the user device (and therefore, as a proxy of the user associated with the user profile). In some instances, additional transactional data may be provided by the user device 210, which may include additional information on financial transactions, messages sent, operations performed in particular applications, and other transactions performed on the user device. The current and recent location data may be provided in absolute GPS coordinates, or alternatively, in data which can allow a particular location to be determined (e.g., nearby available Wi-Fi networks, iBeacon information, etc.). The information from the user devices 210 can be defined as recent contextual user data 215. This may include data received within a particular period of time, or in a predefined number of data updates.

The user context database 230 can also store and associate significant historical user data 220 associated with particular user profiles. The historical user data 220 may include purchase and other transaction histories, user preferences over time, and other information describing and shaping a user's habits and preferences.

The other user data 225 can include sets of context data from one or more other users relative to a particular user. In some instances, the other user data 225 may be obtained based on registered users in a similar location as a particular user when context data is obtained. In some instances, the other user data 225 may be obtained in a similar manner to the particular user, where the context information is obtained over time and added to the user context database 230. A current context, as well as historical information, for the user profiles associated with those other users can be stored in corresponding user profiles. One or more of those current contexts can be compared relative to a user context for a particular user when a notification is triggered.

The identification and obtaining of user context-relevant information can take place over various periods of time. In some instances, only immediately current information may be used for a modification rule, while in others, historical information may be used. As the user profile and contextual information is maintained, the data flow awaits the triggering of a notification associated with one or more of the user profiles. As noted in relation to FIG. 1, the triggered notification may be based on an action performed by a particular user or group of users (e.g., arrive at a particular location, perform a particular transaction, etc.), or may be triggered based on a request from an entity (e.g., a marketing campaign for a sale, financial product, etc.). In FIG. 2, a notification associated with at least one user profile is triggered at 250. In response to the triggered notification, a modification rules engine 240 (e.g., the notification modification module 112 of FIG. 1, an associative rules engine, etc.) identifies the triggered notification and the one or more user profiles associated with it.

The modification rules engine 240 determines at 250 whether a particular modification rule (e.g., of modification rules 255) is satisfied based on a current context associated with the one or more related user profiles. In some instances, in response to 250, the modification rules engine 240 can obtain contextual information from the user context database 230. Additionally, one or more external information sources or data feeds 235 can be accessed, particularly when those sources or data feeds 235 relate specifically to a determination or requirement of a modification rule 255. The modification rules engine 240 can obtain the already available information from the user context database 230, or may trigger or cause an updated and real-time or near real-time current set of contextual information to be obtained from the various sources (e.g., user devices 210, any other user data 225 from user devices associated with related user profiles) in response to determining that a notification has been triggered.

As described, the modification rules 255 being evaluated at 250 may be of any suitable type, including a user profile-specific contextual rule, a relative user context rule, or a location-specific rule, among others. Some examples of particular rules may include:

1) a volume rule, e.g., a rule that allows less than a maximum amount of notifications to be sent per day, either to a specific user, to a particular group of users, or by a particular sending entity;
2) a density rule, e.g., where only a percentage of individuals within a particular area or at a particular location are provided notifications—in some instances, the density rule may only be triggered when a group of a particular size of user profiles are associated with a particular or relative location;
3) a timing rule, e.g., a rule specific to a user profile, where notifications during a certain time range are not allowed;
4) a location-related rule, e.g., where no notifications are allowed when user profiles are associated with a particular location (e.g., a particular user's work may be prohibited for that user, or a place of worship or court where no users may receive notifications); and
5) a contextual location rule, e.g., where if less than a certain number of users are at a location, the notification may be sent, but where more than a certain number of users are at the location, the notification is modified.

These examples are meant to be non-limiting, but illustrate some of the information needed to evaluate the particular modification rules 255. The external information or data feeds 235 may provide additional information not available through the user context database 230, such as information related to a current status of a location or an event associated with the location (e.g., a sporting event). Alternatively, information related to a particular user profile may be found or identified through the external information or feeds 235.

If a determination is made that the current context of a particular user satisfies a particular modification rule, then at 260, the triggered notification is modified based on a corresponding modification action defined by the modification rule. In some instances, the triggered notification can be cancelled. In others, the triggered notification may be delayed for a set period of time, or until the current context of the user profile associated with the notification is modified and no longer satisfies the particular modification rule. In still other instances, the modification rule may cause the contents of the triggered notification to be modified. Where the triggered notification is associated with a plurality of users, only some of those users may see their corresponding notification be modified, such that at least some of the plurality still receive a transmission of the notification. In some instances, the original triggered notification may be associated with a first communication channel (e.g., a push notification). The modification rule may keep the content of the triggered notification the same, but may switch the transmission to a second communication channel (e.g., an email including the contents of the triggered notification, as the email may not be as intrusive to the user). If, however, the modification rule 250 is not satisfied, then at 270, the triggered transmission is transmitted to a user device associated with the user profile.

The analysis performed by the modification rules engine 240 may be performed individually for each user profile associated with a triggered notification. Alternatively, the analysis may be performed for a group of user profiles. Further, multiple modification rules 255 can be evaluated, where appropriate, including modification rules 255 specifically applicable and associated with a particular user, as well as rules that are applied to groups of users and/or particular locations. In some instances, two or more modification rules 255 may be satisfied in response to a triggered notification. If both modification rules 255 cause the notification to be cancelled, then the cancellation can be performed. If the satisfied modification rules 255 contradict one another, or cause inconsistent changes (e.g., delay for a first rule and cancel for a second), the modification rules engine 240 can apply a prioritized rule analysis, perform the more significant action (e.g., perform the cancellation if both cancel and delay are the results of the satisfied rules), or perform some weighing of the modification rules to identify which action is to be taken. Any suitable comparison or weighting can be used.

Figure 3:
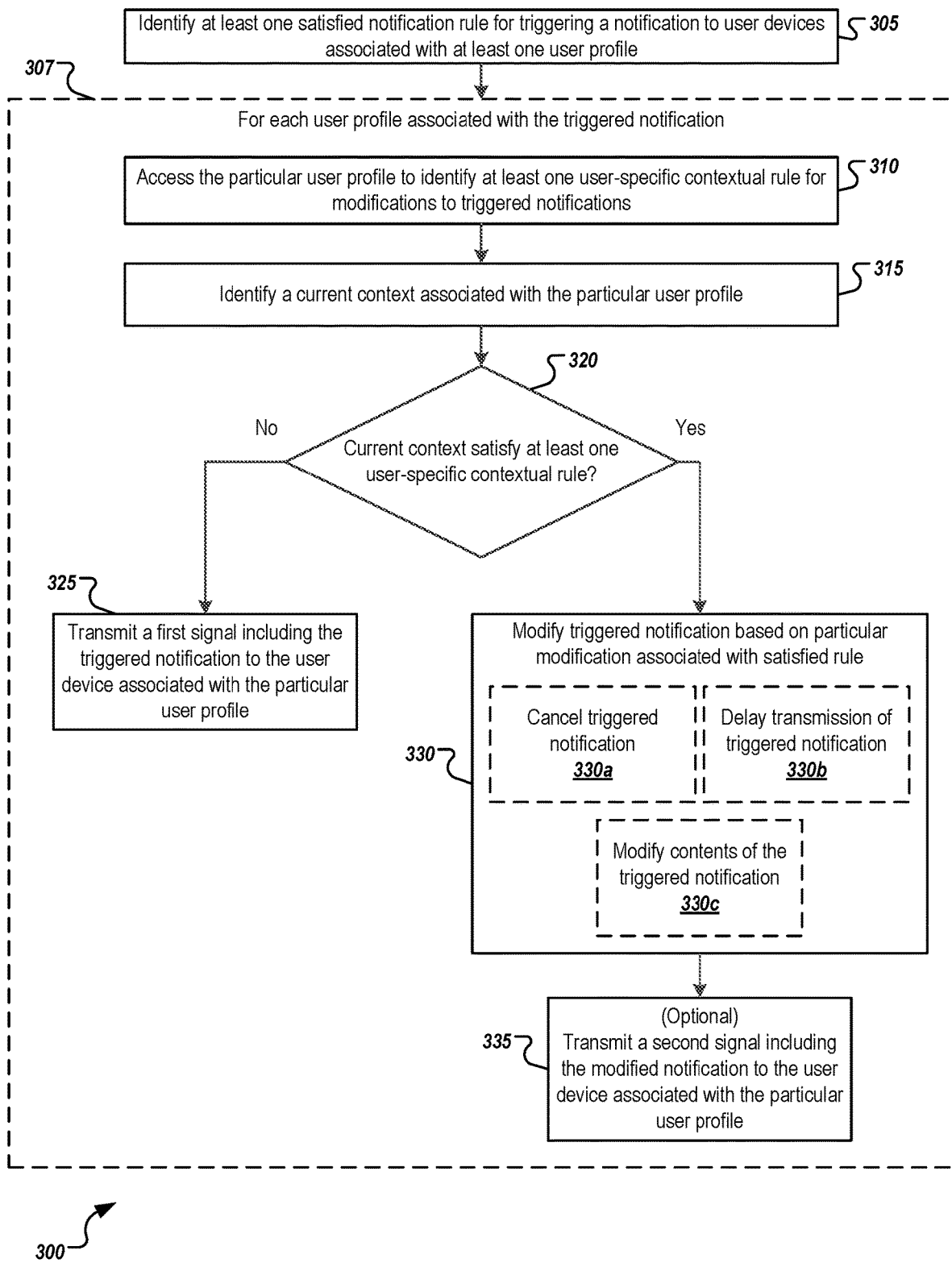
FIG. 3 is a flowchart of an example method for modifying triggered notifications based on one or more user-specific contextual rules.

FIG. 3 is a flowchart of an example method for modifying triggered notifications based on one or more user-specific contextual rules. It will be understood that method 300 and related methods may be performed, for example, by any suitable system, environment, software, and hardware, or a combination of systems, environments, software, and hardware, as appropriate. For example, a system comprising a communications module, at least one memory storing instructions and other required data, and at least one hardware processor interoperably coupled to the at least one memory and the communications module can be used to execute method 300. In some implementations, the method 300 and related methods are executed by one or more components of the system 100 described above with respect to FIG. 1.

At 305, at least one satisfied notification rule for triggering a notification to user devices associated with at least one user profile is identified. The satisfied notification rule may be based on actions performed by users associated with the at least one user profile, or the notification rule may be triggered and satisfied by the sending entity associated with the notification rule. The satisfied notification rule or rules can result in a triggered notification corresponding to the satisfied notification rule to be sent, pushed, or otherwise transmitted to user devices associated with each of the user profiles for which the notification rule is satisfied. Without the present solution, in response to the satisfied notification rule, a notification associated with rule is triggered and sent to user devices associated with each of the at least one user profiles.

In the present example solution described in FIG. 3, however, one or more user-specific contextual rules are evaluated for each user profile associated with a satisfied notification rule. In doing so, the individual context of particular user and their user profiles can be considered prior to the sending of the particular notification associated with the satisfied notification rule. Therefore, the operations described within 307 can be performed for each of the profiles associated with the triggered notifications, where some of the triggered notifications may be transmitted as originally planned, while others may be modified (e.g., delayed, cancelled, changed) based on the user-specific contextual rules.

At 310, a particular user profile can be accessed to identify at least one user-specific contextual rule to be considered for any triggered notifications associated with the particular user profile. In some instances, the user-specific contextual rules can be stored as part of the user profile (e.g., as a part of user- or admin-defined preferences), while in other instances the rules may be available apart from any stored user profile information. If available, the user-specific contextual rules are accessed. In some instances, the user-specific contextual rules (as well as the relative user context-specific rules and the location-specific context rule) may be computed, determined, or otherwise modified via a feedback loop measuring response rates for particular identified contexts. Machine learning methods can be used, where the dependent variable in some instances may be taken as a response from the user as a read receipt or some other proxy related to user interaction with the transmitted notifications to identify that the user has had some response (positive or negative) to the notification. If such rules are not available, the triggered notification can be transmitted for the user profile.

At 315, a current context associated with the particular profile is identified. The current context of the particular user profile can include a current location associated with the user profile, which may be based on or determined from location information provided by a user device associated with the user profile (e.g., a smartphone), location information derived from information available from the user device (e.g., available Wi-Fi networks associated with a particular location), one or more transactions associated with the user profile (e.g., a purchase or other non-financial transaction, where a location is associated with the transaction or can otherwise be derived), information from a social network defining a particular location of the user (e.g., a social network check-in), or known patterns of a user's location (e.g., an expected location based on historical user information). The current context may also or alternatively include a current local time associated with the user profile, recent activity associated with the user profile (e.g., one or more transactions, agnostic of location), prior communication activities performed by the user device (e.g., texts, messaging platform interactions), social network posts, and other information associated specifically with the user profile. In some instances, the user-specific contextual rule may also be based on historical account information associated with the user profile. An example rule may include a maximum number of notifications to be sent to the user device or devices associated with the particular user profile over a predetermined period of time. Using historical account information related to the prior notifications, the user-specific contextual rule can be based on whether prior notifications transmitted to devices associated with the particular user profile exceed the maximum number. The maximum number of notifications may differ by user profile, where different user profiles have different maximum numbers. If the maximum number of prior notifications is met, the rule may be considered satisfied.

At 320, a determination is made as to whether the current context of the particular user profile satisfied at least one user-specific contextual rule. As noted, the user-specific contextual rules can be based on any number of factors or preferences of the user, as well as automatically determined preferences implicitly determined and implemented based on an analysis of the activities and actions of the particular user profile. For example, the system may allow users to define specific blackout periods and/or time ranges where no communications should be sent (e.g., during a particular period of expected sleep in the evenings/night, during periods conflicting with calendar events/meetings associated with the particular user profile, etc.). Alternatively, specific locations (e.g., at a user's place of business) may be specifically defined in association with the particular user profile, such that a determined context of the particular user profile matching those specific contextual parameters will result in any triggered notifications being modified in accordance with the corresponding user-specific contextual rule. The modifications may include a cancellation of the triggered notification, a delay of the triggered notification (e.g., until the context of the particular user profile no longer matches the specific contextual parameters of the user-specific rule), or a modification to the contents of a particular triggered notification.

In response to determining that the current context of the particular user profile does not satisfy the user-specific contextual rule, method 300 continues at 325 where a first signal including the triggered notification is transmitted, via a communications module, to one or more user devices associated with the particular user profile for which the analysis of 307 is performed.

If, however, the current context of the particular user profile does satisfy at least one user-specific contextual rule, then method 300 continues to 330, where the triggered modification is modified based on the particular modification or modifications associated with the satisfied user-specific contextual rule. Three example operations may be performed to modify the notification, including cancelling the triggered notification (330a), delaying transmission of the triggered notification (330b), or modifying the contents of the triggered notification (330c). Cancelling the triggered notification 330a may include suppressing the triggered notification or otherwise stopping the transmission of the notification to the user devices associated with the particular user profile. In some instances, a notification of the cancellation may be provided to the entity sending the notification, where appropriate.

Delaying transmission of the triggered notification (330b) may cause a delay to be implemented in sending the notification. In some instances, the triggered notification may be sent after a predetermined period of time from the initial determination. In other instances, user-specific timing may be appropriate, such as delaying the transmission for a user-specific time period until that user is likely to be outside of the current context (whether location, timing, or other factor). Alternatively, the notification may be delayed and the triggered notification reevaluated (e.g., at 320) after a period of time based on a re-determined current context of the particular user profile after the delay. The determination as to whether a particular user-specific contextual rule remains satisfied can be made again at the later time to identify whether the notification should be sent. Modifying the contents of the triggered notification (330c) can be performed based on the modification rules, and can include determining a particular user device to be sent the transmission, a modification to the contents of the transmission to include additional or less information, or any other suitable change.

At 335, a second signal including the modified notification can be transmitted, via the communications module, to one or more user devices associated with the particular user profile. In instances where the triggered notification is cancelled, no such transmission may be sent and method 300 can conclude for the particular user profile. In instances where the triggered notification is delayed or the contents modified, the delayed or content-modified notification can be sent at 335.

The operations of 307 are performed individually for each particular user profile associated with the triggered notification. The determination of the user-specific contextual rules can be unique to the particular user profile under consideration. In some instances, the operations can be performed in parallel and/or concurrently for each particular user profile. In other instances, the analysis can be performed sequentially, as needed.

Figure 4:
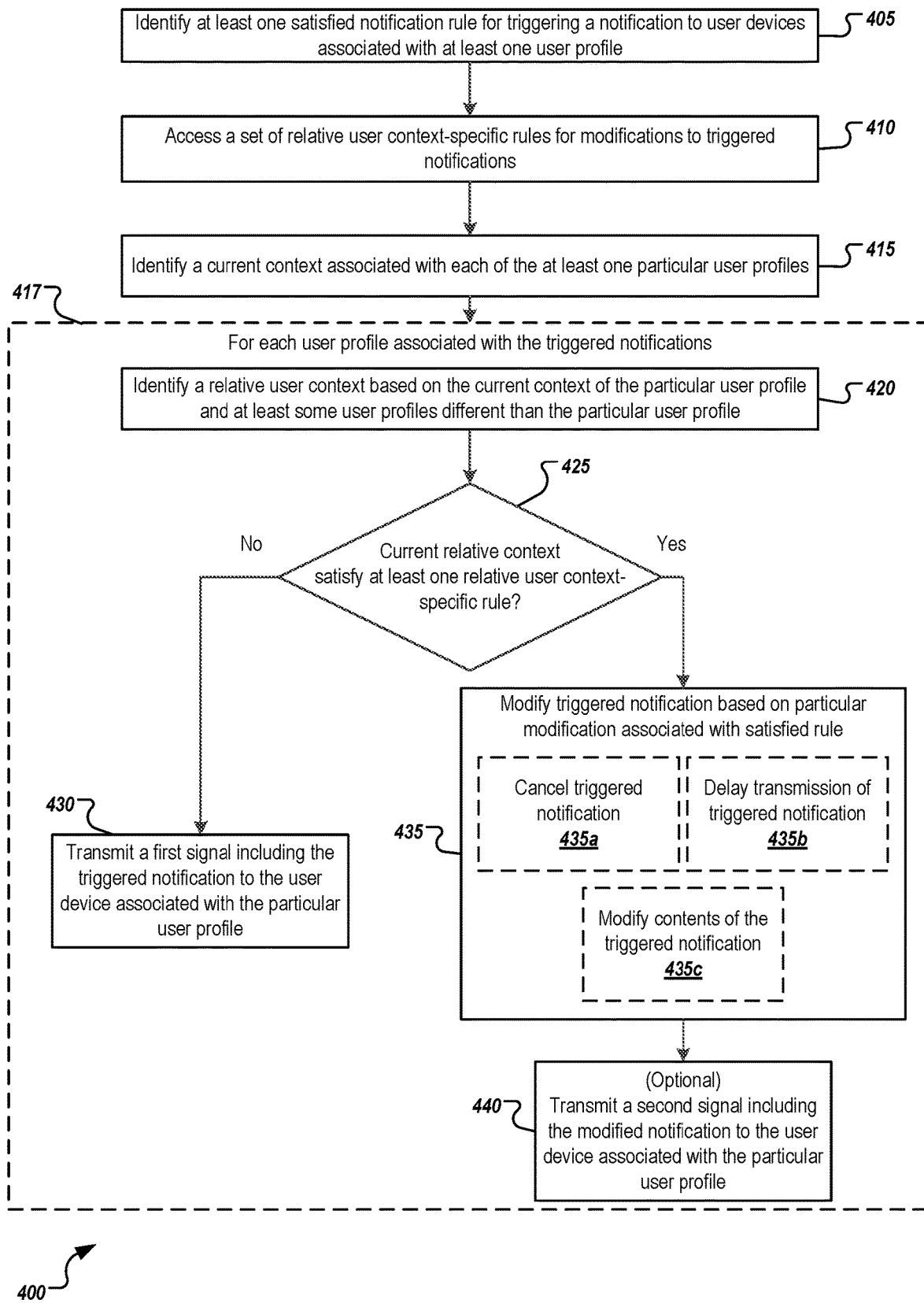
FIG. 4 is a flowchart of an example method for modifying triggered notifications based on an evaluation of one or more contextual rules analyzing a particular user profile relative to at least one other user profile.

FIG. 4 is a flowchart of an example method 400 for modifying triggered notifications based on an evaluation of one or more contextual rules analyzing a particular user profile relative to at least one other user profile. It will be understood that method 400 and related methods may be performed, for example, by any suitable system, environment, software, and hardware, or a combination of systems, environments, software, and hardware, as appropriate. For example, a system comprising a communications module, at least one memory storing instructions and other required data, and at least one hardware processor interoperably coupled to the at least one memory and the communications module can be used to execute method 400. In some implementations, the method 400 and related methods are executed by one or more components of the system 100 described above with respect to FIG. 1.

At 405, at least one satisfied notification rule for triggering a notification to user devices associated with at least one user profile is identified. The operation of 405 may be similar to the operations of 305 described in FIG. 3.

In the present example solution described in FIG. 4, however, one or more relative user context-specific rules are evaluated at 410 based on relative current contexts of two or more user profiles prior to the sending of the particular notification associated with the satisfied notification rule. In order to perform the relative analysis, a set of relative user context-specific rules for modifications to triggered notifications are accessed to determine what factors and considerations are to be made prior to triggering the notifications. In some instances, the relative user context-specific rules may be considered or applied to a group of users at one time, or, alternatively, the rules may be applied against a first user profile in consideration of that first user profile relative to one or more other user profiles.

At 415, a current context associated with each of the at least one particular user profiles associated with the triggered notification is identified. In some instances, a further set of information regarding one or more additional user profiles may be obtained, such as where those other additional user profiles are associated with a location at or near one or more of the user devices of the particular user profiles associated with the triggered notification. The current contexts may be similar to or different those described in connection with FIG. 3.

For each user profile associated with the triggered notifications, an analysis may be performed encompassed by 417, where the specific context of the particular user profile is then compared to and evaluated against the one or more other particular user profiles' current contexts.

At 420, a relative user context can be identified for a particular user profile based on the current context of the particular user profile and at least some of the user profiles different than the particular user profile. In some instances, the relative user context may provide information identifying a number of user profiles within the same location as or a particular distance from the particular user profile. In other instances, a relative number of notifications provided to different user profiles over time may be considered, as well as a level of user interaction from one or more users to whom prior notifications have been transmitted in a similar context or location as the current relative context. In general, the relative user context provides a view of the particular user profile in comparison to one or more other profiles, where the relative user context can be used as a baseline or basis for evaluation against one or more relative user context-specific rules.

At 425, a determination is made as to whether the current relative context satisfies at least one relative user context-specific rule. The relative user context-specific rules can define any suitable rules that applies a comparison of different user profile contexts to each other to determine whether one or more relative parameters are met. For example, an example relative user context-specific rule may define that when a first number of user profiles are associated with the same common location in their identified current contexts, then any triggered notifications should be modified. The common location may be specific to a particular location (e.g., a store, a business, an event hall, etc.), or the common location may be a common location relative to one another (e.g., location-agnostic, but within a predetermined or dynamically-determined distance from one another (e.g., within a 200 foot diameter from each other)). If the number of user profiles associated with the common location exceeds the first number of user profiles, then the rule is satisfied. In some instances, the relative user context-specific rule may be specific to a particular user profile, in that the determination identifies whether a relative user context from the view of the particular user profile satisfies the particular relative user context-specific rule being evaluated. However, one or more of the other user profiles may not be associated with such a rule, such that notifications to those users may be sent if no other modification rules are met. Still further, in some instances, if the combined relative user context satisfies a particular relative user context-specific rule, then corresponding modifications may automatically be made for those user profiles. In some instances, the relative user context may include information about non-registered user profiles where able. For example, in a location-related relative user context-specific rule, a particular number of persons within an area or location may be determinable via outside or external data or information. The relative user context-specific rule may specify absolute numbers in the location as compared to a number of registered users. Alternatively, the relative user context-specific rule may be based on an absolute number, where particular user profiles being associated with a location may be used as a proxy for a total number of persons being at the location. That is, if 10 user profiles are currently located at or associated with a location, then an estimate for a particular time of day may indicate that 100 total people are at the location based on market share or percentage of the population registered, for example.

If it is determined that none of the at least one relative user context-specific rules are met, method 400 continues at 430, where a first signal including the triggered notification is transmitted, via a communications module, to a user device associated with the particular user profile. If, however, at least one relative user context-specific rule is satisfied based on the current relative user context, then method 400 continues at 435. Depending on the modifications specific to the satisfied rule, at 435 the triggered notification for the particular user may be cancelled (435a), delayed (435b), or the contents thereof can be modified (435c). The operations of 435 and 435a-c may be similar to or different than those of 330 and 330a-c of FIG. 3. At 440, a second signal including the modified notification can be transmitted, via the communications module, to one or more user devices associated with the particular user profile (where appropriate). In instances where the triggered notification is cancelled, no such transmission may be sent and method 400 can conclude for the particular user profile. In instances where the triggered notification is delayed or the contents modified, the delayed or content-modified notification can be sent at 440.

In some instances, the operations of 417 are performed individually for each particular user profile associated with the triggered notification. The determination of the relative user context-specific rules can be unique to the particular user profile under consideration. In other instances, a group of user profiles associated with a similar or related context can be considered together, with the modifications being applied to the triggered notifications associated with each member of the group.

In some instances, the modification operations may be used to cancel or delay triggered notifications for only some of the user profiles associated with a group of contextually-related user profiles. For example, a subset of the user profiles associated with a common location may be identified to still receive the triggered notification, while others outside that subset, but still at the common location, may have their notifications cancelled or delayed. In such instances, the triggered notifications may be sent to the user devices of those user profiles included in the subset even though they originally satisfy the relative user context-specific rule.

In some instances, the relative user context-specific rule may be based on the set of user profiles who are associated with a similar or common triggered notification. In those instances, the relative user context-specific rule may identify a maximum number of user profiles allowed to receive a particular triggered notification. The rule may be in effect to limit costs of sending the notification, or to avoid over sending said notification. In any event, a subset of those user profiles associated with the triggered notification can be pruned or otherwise narrowed in order to meet those requirements of the rule. Once narrowed, the triggered notification can be sent to the appropriate user profiles (via their devices), while the notifications for the non-receiving user profiles can be cancelled.

Figure 5:
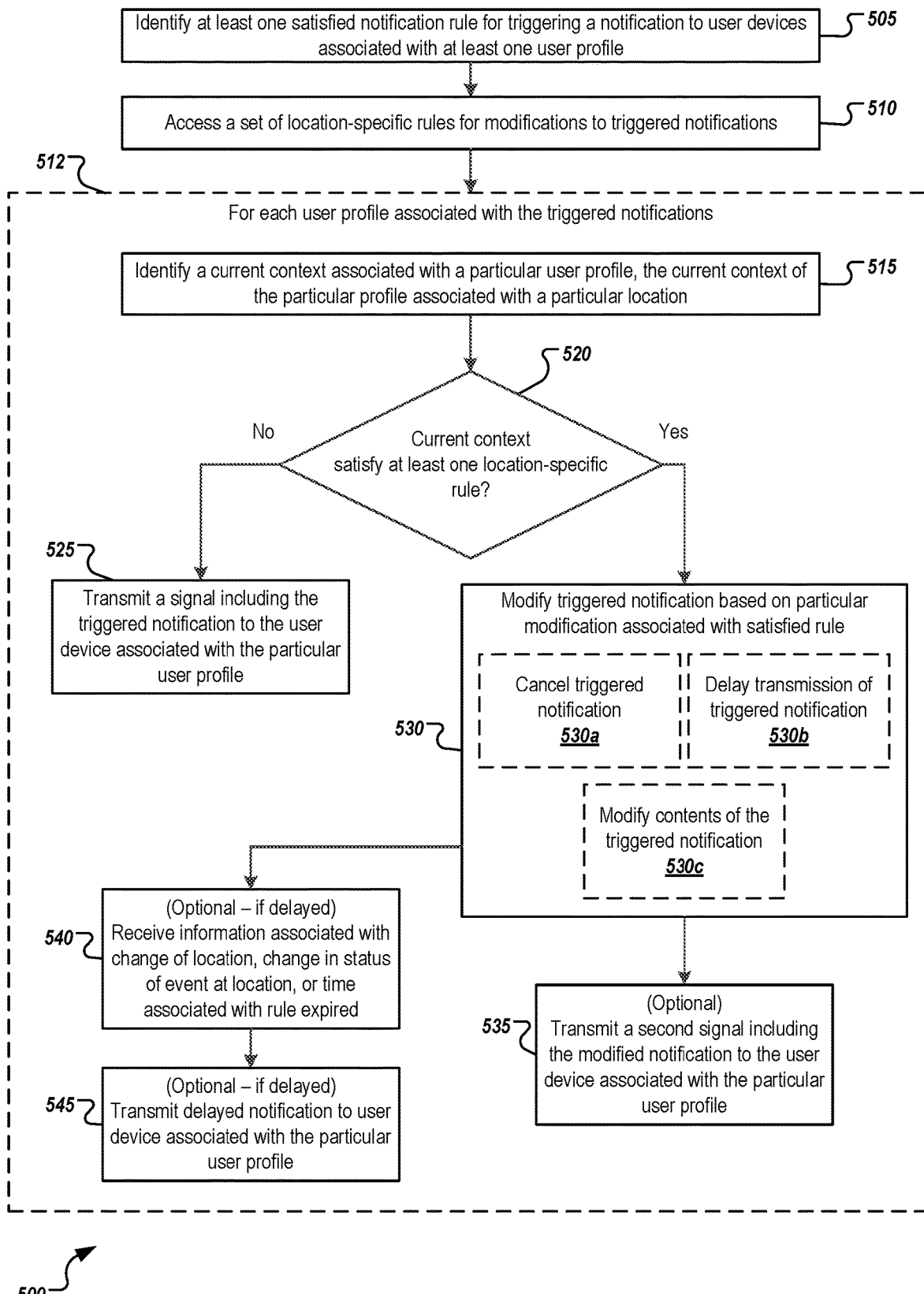
FIG. 5 is a flowchart of an example method for modifying triggered notifications associated with particular users based on an evaluation of one or more location-specific contextual rules.

FIG. 5 is a flowchart of an example method 500 for modifying triggered notifications associated with particular users based on an evaluation of one or more location-specific contextual rules. It will be understood that method 500 and related methods may be performed, for example, by any suitable system, environment, software, and hardware, or a combination of systems, environments, software, and hardware, as appropriate. For example, a system comprising a communications module, at least one memory storing instructions and other required data, and at least one hardware processor interoperably coupled to the at least one memory and the communications module can be used to execute method 500. In some implementations, the method 500 and related methods are executed by one or more components of the system 100 described above with respect to FIG. 1.

At 505, at least one satisfied notification rule for triggering a notification to user devices associated with at least one user profile is identified. The operation of 505 may be similar to the operations of 305 described in FIGS. 3 and 405 described in FIG. 4.

At 510, a set of location-specific rules associated with modifications to one or more triggered notifications is identified. The location-specific rules are used to associate specific rules and notification behavior to specific locations. Examples of such locations that may be associated with a location-specific rule may include places of worship, hospitals, office buildings, a particular business entity, courthouses, governmental buildings, stadiums and other sporting or recreational event locations, theaters, schools, and others. In some instances, the location-specific rule may be specifically associated with both a location and a particular event occurring at the location, such that the location-specific rule can only be satisfied while the particular event or events are occurring. For example, triggered notifications may be suppressed when they are triggered while an event is actually occurring at the location, such as a play, a game, or another event. Information about when those events are occurring may be known or may follow a predetermined schedule or the ongoing occurrence or current status of the event may be dynamically determined. Both the predetermined schedule and the ongoing occurrence or current status may be known based on one or more social network or alternative feeds, such as a sporting event data feeds, an available schedule including runtimes and/or event timelines (e.g., from a movie theater calendar, playbill, etc.), or based on social network feeds (e.g., after-show posts or comments regarding the event, as well as social network posting velocity at or around an expected end time). For purposes of the location-specific rules described in FIG. 5, the location of associated with a particular user profile (e.g., based on the location of a user device associated with the particular user profile) is the primary and, in some cases, sole determination of whether the location-specific rule is satisfied.

For each user profile associated with the triggered notification, an analysis may be performed (encompassed by 512), where the specific context of the particular user profile is then compared to the specific location or locations identified and associated with the location-specific rule. In some instances, but not illustrated specifically in FIG. 5, a specific location rule may be included or considered in combination with one or more user-specific contextual rules and/or one or more relative user context-specific rules, where appropriate.

At 515, a current context associated with a particular user profile is identified, where the current context of the particular user profile is associated with a particular location. The particular location may be determined based on information received from a user device associated with the particular user profile (e.g., GPS or aGPS data, or derived information based on a set of contextual parameters detected by the user device), a calendar identifying the expected location of the person associated with the particular user profile at a particular time, particular transactional information identifying a location (e.g., purchase or financial transaction data, connection to a particular network, interaction with one or more systems, etc.), or other suitable information capable of being used to identify a particular location associated with the particular user profile.

At 520, a determination is made as to whether the current context and the associated location satisfy at least one location-specific rule. As noted, location-specific rules may be associated with a valid time range (e.g., predetermined or dynamically determined). Evaluating whether the current context of the particular user profile satisfies the at least one location-specific rule can be based on a combination of comparisons to determine which location-specific rules are active and which of those active rules are then satisfied.

If it is determined that none of the at least one location-specific rules are met, method 500 continues at 525, where a first signal including the triggered notification is transmitted, via a communications module, to a user device associated with the particular user profile. If, however, at least one location-specific rule is satisfied, based on the current user context, then method 500 continues at 530. Depending on the modifications specific to the satisfied location-specific rule, at 530 the triggered notification for the particular user may be cancelled (530a), delayed (530b), or the contents thereof can be modified (530c). The operations of 530 and 530a-c may be similar to or different from those of 330 and 330a-c of FIGS. 3 and 435 and 435a-c of FIG. 4.

At 535, a second signal including the modified notification can be transmitted, via the communications module, to one or more user devices associated with the particular user profile (where appropriate). In instances where the triggered notification is cancelled, no such transmission may be sent and method 500 can conclude for the particular user profile. In instances where the triggered notification is delayed or the contents modified, the delayed or content-modified notification can be sent at 535.

In some instances, the delay of 530b may be of a predetermined time. In other instances, the delay of 530b may be for a dynamically determined period of time while the current context of the user profiles remains at or associated with the particular location, or alternatively, while the event at the location continues. In some instances, delayed notifications may be transmitted in response to a determination or timing of an intermission, either based on the location being changed (e.g., exiting the theater during the middle of a scheduled performance) or based on a known break. In still other instances, local feeds from the location of the event or from a sponsor, broadcaster, or other entity associated with the event may provide information about the current status of the event (e.g., play-by-play indicating the end of an inning, or other temporary stoppage in play). In those instances, at 540 the system may receive information associated with or indicating a change of location for the user profile from the specific location associated with the location-specific rule, or information indicating or determining that the event at the location is over. In some instances, a predetermined time from the initial delay action may have expired as well. Once the information is received or the delay expires, at 545 the delayed notification is transmitted to a user device associated with the particular user profile.

In FIGS. 3, 4, and 5, the user-specific rules, the relative user context rules, and the location-specific rules are described as separate and distinct rule sets. However, one or more of the different rules can be combined or applied together in some instances, or may be combined into a single combined modification rule. The combination of the rules, or a sequentially combined set of rules (e.g., in a particular relative user context, apply a location-specific rule) may be created and applied.

The preceding figures and accompanying description illustrate example processes and computer-implementable techniques. But system 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the operations in these processes may take place simultaneously, concurrently, and/or in different orders than as shown. Moreover, the described systems and flows may use processes and/or components with or performing additional operations, fewer operations, and/or different operations, so long as the methods and systems remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A system comprising:
a communications module;
at least one memory storing instructions, a plurality of user profiles, each user profile associated with a user device, a repository of notification rules including at least one rule set identifying events for triggering notifications to user devices associated with particular ones of the user profiles based on a set of notification requirements, and a repository of notification modification rules identifying contextual determinations associated with the particular ones of the user profiles related to the triggered notification, where the notification modification rules identify a particular modification to the triggered notification prior to transmission of the triggered notification, wherein at least one notification modification rule identifies modifications to triggered notifications based on a location-specific contextual rule; and at least one hardware processor interoperably coupled with the at least one memory and the communications module, wherein the instructions instruct the at least one hardware processor to:
- identify at least one satisfied notification rule for triggering notifications to a user device associated with at least one particular user profile;
- for each of the at least one particular user profiles:
  - identify a current user context associated with the particular user profile, the current user context identifying a particular location associated with the particular user profile;
  - in response to determining that a particular current location associated with the particular user profile satisfies at least one location-specific contextual rule and before the notification is transmitted, modify the triggered notification for the particular user profile based on the particular modification associated with the satisfied location-specific contextual rule; and
  - in response to determining that the identified current user context associated with the particular user profile does not satisfy at least one location-specific contextual rule, transmit, via the communications module, a first signal to the user device associated with the particular user profile, the first signal including the triggered notification.

2. The system of claim 1, wherein the particular location associated with the particular user profile comprises a particular location of the user device associated with the particular user profile.

3. The system of claim 2, wherein the particular location of the user device associated with the particular user profile comprises a current location of the user device at a time at which the at least one notification rule is satisfied, and wherein the determination of whether the at least one location-specific contextual rule is satisfied is based on the time at which the at least one notification rule is satisfied.

4. The system of claim 2, wherein the particular location of the user device associated with the particular user profile comprises a current location of the user device at a time when the triggered notification is to be transmitted, and wherein the determination of whether the at least one location-specific contextual rule is satisfied is based on the time at which the triggered notification is to be transmitted.

5. The system of claim 2, wherein the particular location of the user device associated with the particular user profile comprises a location history of the user device, and wherein the at least one location-specific contextual rule is satisfied based on an analysis of the location history associated with the user profile.

6. The system of claim 1, wherein the at least one location-specific contextual rule is associated with a defined location, and where the at least one location-specific contextual rule is associated with a specific time range during which the at least one location-specific contextual rule is valid.

7. The system of claim 6, wherein in response to determining that the particular location associated with the particular user profile corresponds to the defined location at a time outside the specific time range associated with the at least one location-specific contextual rule, the at least one location-specific contextual rule is not satisfied.

8. The system of claim 6, wherein the defined location is associated with an event.

9. The system of claim 8, the instructions instructing the at least one hardware processor to:
receive, via the communications module, a second signal including status information from a data feed associated with the event, wherein the status information determines whether the event is ongoing, wherein the at least one location-specific rule is satisfied when the triggered notification is to be transmitted while the event is ongoing.

10. The system of claim 9, wherein modifying the triggered notification for the particular user profile comprises delaying transmission of the triggered notification to the user device associated with the particular profile until after obtaining, via the communications module, information from the data feed indicating that the event has ended.

11. The system of claim 9, wherein modifying the triggered notification for the particular user profile comprises delaying transmission of the triggered notification to the user device associated with the particular profile until after obtaining, via the communications module, information from the data feed indicating that the event is at an intermission or break.

12. The system of claim 9, wherein the data feed associated with the event comprises a social media feed.

13. The system of claim 1, wherein modifying the triggered notification for the particular user profile comprises delaying transmission of the triggered notification.

14. The system of claim 13, wherein the transmission of the triggered notification is delayed until a time when the location of the current user context associated with the particular user profile does not satisfy the location-specific contextual rule.

15. A non-transitory, computer-readable medium storing computer-readable instructions executable by a computer, a plurality of user profiles, each user profile associated with a user device, a repository of notification rules including at least one rule set identifying events for triggering notifications to user devices associated with particular ones of the user profiles based on a set of notification requirements, and a repository of notification modification rules identifying contextual determinations associated with the particular ones of the user profiles related to the triggered notification, where the notification modification rules identify a particular modification to the triggered notification prior to transmission of the triggered notification, wherein at least one notification modification rule identifies modifications to triggered notifications based on a location-specific contextual rule, the computer-readable instructions configured to:
- identify at least one satisfied notification rule for triggering notifications to a user device associated with at least one particular user profile;
- for each of the at least one particular user profiles:
  - identify a current user context associated with the particular user profile, the current user context identifying a particular location associated with the particular user profile;
  - in response to determining that a particular current location associated with the particular user profile satisfies at least one location-specific contextual rule and before the notification is transmitted, modify the triggered notification for the particular user profile based on the particular modification associated with the satisfied location-specific contextual rule; and
  - in response to determining that the identified current user context associated with the particular user profile does not satisfy at least one location-specific contextual rule, transmit, via the communications module, a first signal to the user device associated with the particular user profile, the first signal including the triggered notification.

16. The computer-readable medium of claim 15, wherein the particular location associated with the particular user profile comprises a particular location of the user device associated with the particular user profile.

17. The computer-readable medium of claim 16, wherein the particular location of the user device associated with the particular user profile comprises a current location of the user device at a time at which the at least one notification rule is satisfied, and wherein the determination of whether the at least one location-specific contextual rule is satisfied is based on the time at which the at least one notification rule is satisfied.

18. The computer-readable medium of claim 16, wherein the particular location of the user device associated with the particular user profile comprises a current location of the user device at a time when the triggered notification is to be transmitted, and wherein the determination of whether the at least one location-specific contextual rule is satisfied is based on the time at which the triggered notification is to be transmitted.

19. The computer-readable medium of claim 15, wherein the at least one location-specific contextual rule is associated with a defined location, and where the at least one location-specific contextual rule is associated with a specific time range during which the at least one location-specific contextual rule is valid, wherein in response to determining that the particular location associated with the particular user profile corresponds to the defined location at a time outside the specific time range associated with the at least one location-specific contextual rule, the at least one location-specific contextual rule is not satisfied.

20. A computerized method performed by one or more processors, the method comprising:

identify at least one satisfied notification rule from a plurality of notification rules for triggering notifications to a user device associated with at least one particular user profile from a plurality of user profiles, each user profile associated with a user device, the notification rules including at least one rule set identifying events for triggering notifications to user devices associated with particular ones of the user profiles based on a set of notification requirements, wherein the plurality of notification rules are associated with a plurality of notification modification rules identifying contextual determinations associated with the particular ones of the user profiles related to the triggered notification, where the notification modification rules identify a particular modification to the triggered notification prior to transmission of the triggered notification, each notification modified rule based on a location-specific contextual rule;

for each of the at least one particular user profiles:
  identify a current user context associated with the particular user profile, the current user context identifying a particular location associated with the particular user profile;
  in response to determining that a particular current location associated with the particular user profile satisfies at least one location-specific contextual rule and before the notification is transmitted, modify the triggered notification for the particular user profile based on the particular modification associated with the satisfied location-specific contextual rule; and
  in response to determining that the identified current user context associated with the particular user profile does not satisfy at least one location-specific contextual rule, transmit, via the communications module, a first signal to the user device associated with the particular user profile, the first signal including the triggered notification.

\* \* \* \* \*